United States Patent
Nagai et al.

(10) Patent No.: US 12,403,452 B2
(45) Date of Patent: Sep. 2, 2025

(54) STATIONARY PHASE FOR CHROMATOGRAPHY

(71) Applicant: DAICEL CORPORATION, Osaka (JP)

(72) Inventors: Kanji Nagai, Tokyo (JP); Satoshi Shinkura, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 798 days.

(21) Appl. No.: 17/271,688

(22) PCT Filed: Aug. 30, 2019

(86) PCT No.: PCT/JP2019/034204
§ 371 (c)(1),
(2) Date: Feb. 26, 2021

(87) PCT Pub. No.: WO2020/045648
PCT Pub. Date: Mar. 5, 2020

(65) Prior Publication Data
US 2021/0252479 A1  Aug. 19, 2021

(30) Foreign Application Priority Data
Aug. 30, 2018  (JP) .................. 2018-161561

(51) Int. Cl.
*B01J 20/285* (2006.01)
*B01D 15/40* (2006.01)
*B01J 20/30* (2006.01)
*C08F 2/44* (2006.01)
*C08F 222/38* (2006.01)

(52) U.S. Cl.
CPC ............ *B01J 20/285* (2013.01); *B01D 15/40* (2013.01); *B01J 20/30* (2013.01); *C08F 2/44* (2013.01); *C08F 222/38* (2013.01)

(58) Field of Classification Search
CPC ...... B01J 20/285; B01J 20/286; B01J 20/298; B01J 20/299; B01J 20/29; C08F 222/38; C08F 222/36
See application file for complete search history.

(56) References Cited

U.S. PATENT DOCUMENTS

| | | |
|---|---|---|
| 2010/0210458 A1 | 8/2010 | Katsuhara et al. |
| 2015/0251158 A1* | 9/2015 | Gu .................. B01J 20/262 556/416 |
| 2017/0056854 A1 | 3/2017 | Gu |
| 2018/0050282 A1 | 2/2018 | Nagai et al. |
| 2021/0220814 A1* | 7/2021 | Xu .................. C08F 212/36 |

FOREIGN PATENT DOCUMENTS

| | | |
|---|---|---|
| EP | 0 268 243 A2 | 5/1988 |
| JP | 2003-337125 A | 11/2003 |
| JP | 2010-190602 A | 9/2010 |
| JP | 2015-531312 A | 11/2015 |
| JP | 2016-190204 A | 11/2016 |
| JP | 2017-515129 A | 6/2017 |
| WO | WO 2004/002818 A1 | 1/2004 |
| WO | WO 2014/201033 A1 | 12/2014 |
| WO | WO 2016/152996 A1 | 9/2016 |

OTHER PUBLICATIONS

WEETALL (Applied Biochemistry and Biotechnology, 41, 1993, p. 157-188). "Preparation of Immobilized Proteins Covalently Coupled Through Silane Coupling Agents to Inorganic Supports" (Year: 1993).*
Ihara et al., "Poly(4-Vinylpyridine) as Novel Organic Phase for RP-HPLC. Unique Selectivity for Polycyclic Aromatic Hydrocarbons," Journal of Liquid Chromatography & Related Technologies (2003); vol. 26, No. 15, pp. 2491-2503.
International Preliminary Report on Patenability and Written Opinion mailed Mar. 11, 2021, in PCT/JP2019/034204.
International Search Report mailed Dec. 3, 2019, in PCT/JP2019/034204.
West, C. and E. Lesellier, "Chemometric methods to classify stationary phases for achiral packed col. supercritical fluid chromatography," J. Chemometrics (2012), vol. 26, pp. 52-65.
West, C. and E. Lesellier, "Orthogonal screening system of columns for supercritical fluid chromatography," Journal of Chromatography A (2008), vol. 1203, pp. 105-113.
Extended European Search Report for European Corresponding Application No. 19854825.7, dated Oct. 5, 2021.

* cited by examiner

*Primary Examiner* — Ryan B Huang
(74) *Attorney, Agent, or Firm* — Birch, Stewart, Kolasch & Birch, LLP

(57) ABSTRACT

Provided is a stationary phase for chromatography, the stationary phase being made of inorganic carrier particles to which is bonded a polymer having a hydrophilic group on repeating units of a main chain thereof, and being produced by a particular production method.

16 Claims, 6 Drawing Sheets

STATIONARY PHASE FOR CHROMATOGRAPHY

TECHNICAL FIELD

The present disclosure relates to a chromatography technique. More specifically, the disclosure relates to a stationary phase that can be used in chromatography.

BACKGROUND ART

Liquid chromatography and supercritical fluid chromatography (SFC) are widely known as chromatography.

Examples of stationary phases that can be used in SFC include, as discussed in Non-Patent Document 1, silica gel and silica gel that is surface-modified with various atomic groups. In particular, the stationary phases frequently used in SFC include a stationary phase having (2-pyridyl)ethyl groups bonded therein, which is referred to as "2-ethylpyridine". Even in cases where basic compounds that result in broad peaks due to tailing in ordinary stationary phases are separated, it is preferred because not only elution of the basic compounds gives a sharp peak, but also acidic compounds can be suitably retained as well when the stationary phase is used.

Yet, as pointed out in Non-Patent Document 2, there are also many stationary phases which have similar retention tendencies for various compounds and thus lack differences in their retention characteristics.

The vast majority of stationary phases for SFC that have been used to date are silica gels or silica gels that are surface-modified with various low-molecular-weight compounds. At the same time, stationary phases that are silica gels surface-modified with polymers have also been reported in the documents.

For example, as described in Non-Patent Document 3 and Patent Document 1, vinyl polymers have been used as the stationary phase for high-performance liquid chromatography. In these examples, poly(4-vinylpyridine) that is chemically bonded onto a silica gel surface is used and has been shown to be effective for separating various compounds.

In addition, a technique for applying a zwitterionic substance that is carried by a monolithic carrier to liquid chromatography is also known for separation of hydrophilic substances such as bio-related substances (Patent Document 2).

CITATION LIST

Patent Document
Patent Document 1: JP 2003-337125 A
Patent Document 2: JP 2010-190602 A Non-Patent Literature Non-Patent Document 1: C. West et al., J. Chromatogr. A, 1203 (2008) 105
Non-Patent Document 2: C. West et al., J. Chemometrics, 26 (2012) 52
Non-Patent Document 3: H. Ihara et al., J. Liq. Chromatogr. Relat. Technol. 26 (2003) 2491

SUMMARY OF INVENTION

Technical Problem

An object of the present disclosure is to provide a stationary phase for chromatography having a good molecular recognition ability, and having good separation characteristics, particularly for hydrophilic compounds.

Solution to Problem

The inventors have conducted extensive research aimed at resolving the above problems, and as a result, they have discovered a stationary phase for chromatography made of inorganic carrier particles to which is bonded a polymer having a hydrophilic group on repeating units of a main chain thereof, and obtained by a production method including a specific step, and that the stationary phase exhibits a good molecular recognition ability in chromatography, particularly in supercritical fluid chromatography. The present disclosure has been accomplished thereby.

The present disclosure is described below.

[1] A stationary phase for chromatography made of inorganic carrier particles to which is bonded a polymer having a hydrophilic group on repeating units of a main chain thereof, in which the stationary phase is produced by a production method including any of steps (i) to (v) below.

(i) radically copolymerizing a (meth)acrylic monomer having a hydrophilic group or a (meth)acrylamide monomer having a hydrophilic group with the inorganic carrier particle having a polymerizable functional group bonded thereto;

(ii) producing a polymer by radically polymerizing a (meth)acrylic monomer having a hydrophilic group or a (meth)acrylamide monomer having a hydrophilic group in the presence of a chain transfer agent having on an end thereof a crosslinkable silyl group; and silane coupling the resulting polymer on a surface of the inorganic carrier particle;

(iii) copolymerizing a (meth)acrylic monomer having a hydrophilic group or a (meth)acrylamide monomer having a hydrophilic group with a silane coupling agent having a polymerizable double bond, and silane coupling the resulting polymer on a surface of the inorganic carrier particle;

(iv) copolymerizing a silane coupling agent having a polymerizable double bond with a (meth)acrylic monomer having a hydrophilic group or a (meth)acrylamide monomer having a hydrophilic group in the presence of the inorganic carrier particle; and (v) introducing a chain transferring functional group onto a surface of the inorganic carrier particle, and radically polymerizing a (meth)acrylic monomer having a hydrophilic group or a (meth)acrylamide monomer having a hydrophilic group.

[2] The stationary phase for chromatography according to [1], in which the (meth)acrylic monomer having a hydrophilic group or the (meth)acrylamide monomer having a hydrophilic group has a structure represented by Formula (1) below:

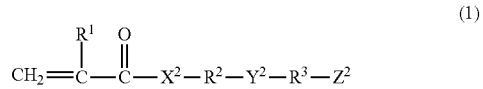

In Formula (1),
$R^1$ is hydrogen or an alkyl of 1 to 6 carbon atoms;
$R^2$ is a single bond or an alkylene of 1 to 12 carbon atoms;
$R^3$ is a single bond or an alkylene of 1 to 6 carbon atoms;
$X^2$ is —O—, —NH—, or —N(CH$_3$)—,
$Y^2$ is a single bond,

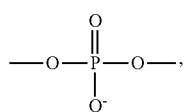

—N⁺H₂—, —N⁺(R⁴)₂—, or

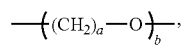

a is an integer of 1 to 5, and b is an integer of 1 to 20;

$Z^2$ is hydrogen, alkyl of 1 to 6 carbon atoms, halogen, —N⁺R₃⁴,

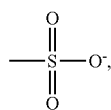

—CO₂⁻, or;

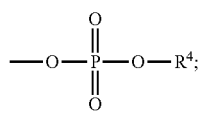

$R^4$ is hydrogen, an alkyl of 1 to 6 carbon atoms, or a hydroxyalkyl of 1 to 6 carbon atoms.

[3] The stationary phase for chromatography according to [1] or [2], in which the inorganic carrier particles are porous inorganic particles or non-porous inorganic particles.

[4] The stationary phase for chromatography according to [3], in which the inorganic carrier particles are porous inorganic particles, and the porous inorganic particles are core-shell particles.

[5] The stationary phase for chromatography according to any one of [1] to [4], in which an average particle size is from 0.1 μm to 50 μm.

[6] The stationary phase for chromatography according to any one of [1] to [5], which is used for supercritical fluid chromatography.

[7] A method for separating a target substance, the method including separating the target substance using the stationary phase described in any one of [1] to [6] and a mobile phase containing a supercritical fluid.

[8] A method for producing a stationary phase for chromatography, the method including any of steps (i) to (v) below:
  (i) radically copolymerizing a (meth)acrylic monomer having a hydrophilic group or a (meth)acrylamide monomer having a hydrophilic group with an inorganic carrier particle having a polymerizable functional group bonded thereto;
  (ii) producing a polymer by radically polymerizing a (meth)acrylic monomer having a hydrophilic group or a (meth)acrylamide monomer having a hydrophilic group in the presence of a chain transfer agent having on an end thereof a crosslinkable silyl group; and silane coupling the resulting polymer on a surface of an inorganic carrier particle;
  (iii) copolymerizing a (meth)acrylic monomer having a hydrophilic group or a (meth)acrylamide monomer having a hydrophilic group with a silane coupling agent having a polymerizable double bond, and silane coupling the resulting polymer on a surface of an inorganic carrier particle;
  (iv) copolymerizing a silane coupling agent having a polymerizable double bond with a (meth)acrylic monomer having a hydrophilic group or a (meth)acrylamide monomer having a hydrophilic group in the presence of an inorganic carrier particle; and
  (v) introducing a chain transferring functional group onto a surface of an inorganic carrier particle, and radically polymerizing a (meth)acrylic monomer having a hydrophilic group or a (meth)acrylamide monomer having a hydrophilic group.

[9] The method for producing a stationary phase for chromatography according to [8], in which the (meth)acrylic monomer having a hydrophilic group or the (meth)acrylamide monomer having a hydrophilic group has a structure represented by Formula (1) below:

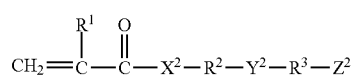
(1)

In Formula (1), $R^1$ is hydrogen or an alkyl of 1 to 6 carbon atoms;
$R^2$ is a single bond or an alkylene of 1 to 12 carbon atoms;
$R^3$ is a single bond or an alkylene of 1 to 6 carbon atoms;
$X^2$ is —O—, —NH—, or —N(CH₃)—,
$Y^2$ is a single bond,

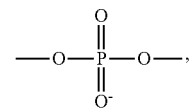

—N⁺H₂—, —N⁺(R⁴)₂—, or

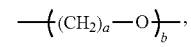

a is an integer of 1 to 5, and b is an integer of 1 to 20;

$Z^2$ is hydrogen, alkyl of 1 to 6 carbon atoms, halogen, —N⁺R₃⁴,

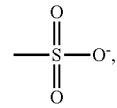

—CO₂⁻, or

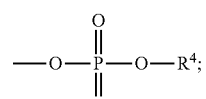

R⁴ is hydrogen, an alkyl of 1 to 6 carbon atoms, or a hydroxyalkyl of 1 to 6 carbon atoms.

[10] The method for producing a stationary phase for chromatography according to [8] or [9], in which the inorganic carrier particles are porous inorganic particles or non-porous inorganic particles.

[11] The method for producing a stationary phase for chromatography according to [10], in which the inorganic carrier particles are porous inorganic particles, and the porous inorganic particles are core-shell particles.

Advantageous Effects of Invention

According to the present disclosure, it is possible to provide a stationary phase for chromatography which has a good molecular recognition ability, and has good separation characteristics, particularly for hydrophilic substances.

DESCRIPTION OF EMBODIMENTS

Figure 1:
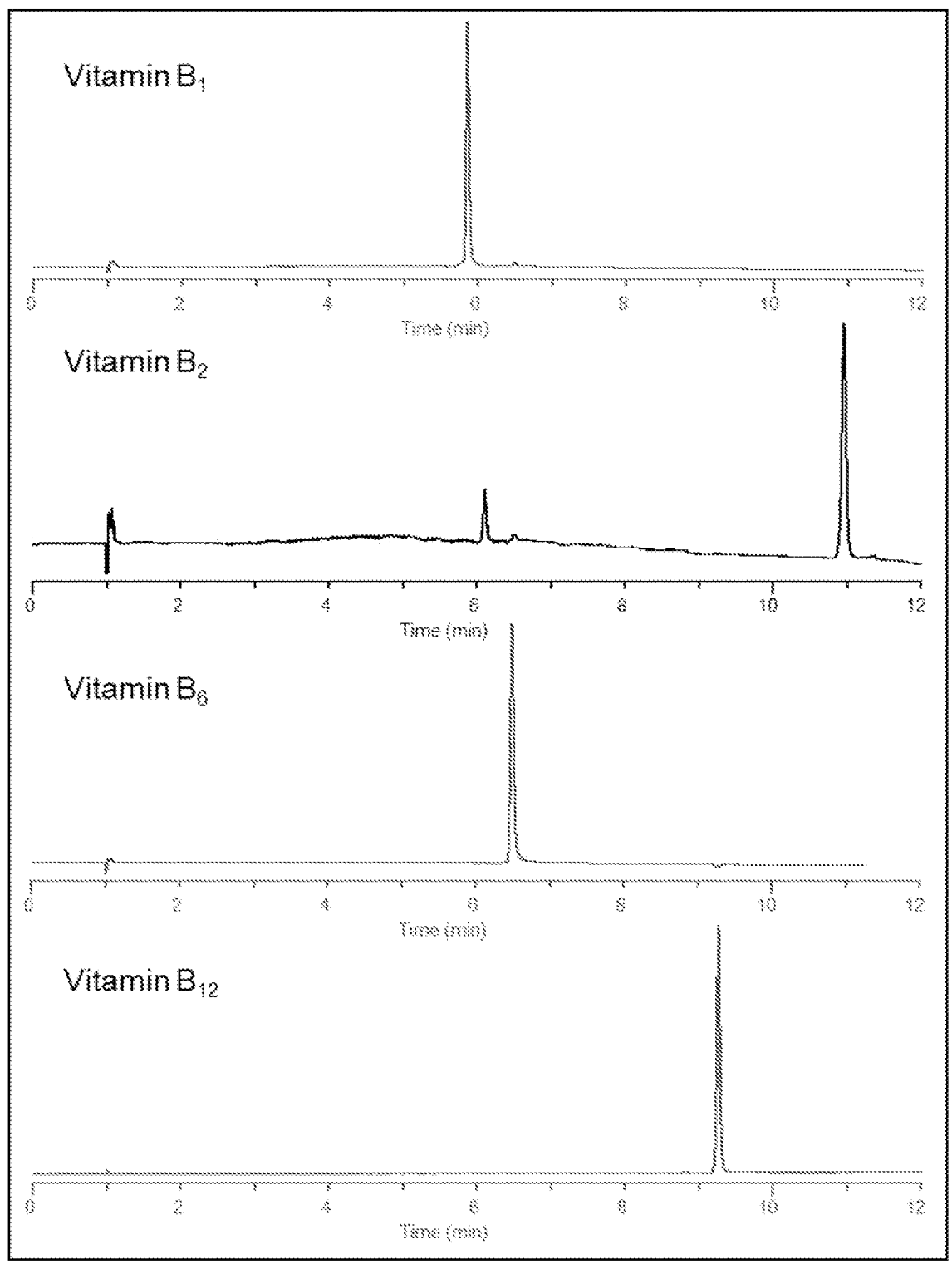
FIG. 1 is a chromatogram showing the separation of water-soluble vitamins by SFC using a poly(PA)-bonded silica gel as the stationary phase.

The stationary phase for chromatography of the present disclosure includes an inorganic carrier particle to which is bonded a polymer having a hydrophilic group on repeating units of a main chain thereof.

As used herein, "stationary phase" refers to a material which, in chromatography, is immobilized at the interior of an analytical instrument (a column or capillary) and brings about, between itself and a fluid that moves while remaining in touch with the material, the partitioning and separation of substances to be separated. When the material is in the form of particles, "stationary phase" may denote the bulk material formed by the packing of these particles or may denote the individual particles.

Here, preferred examples of the "hydrophilic group" include an ionic group of an amphoteric ion, a cation, or an anion, for example. Examples thereof include a hydroxyl group, a carboxyl group, a sulfonic acid group, an amide group, an amino group, a dialkylamino group, a trialkylamino base, a trialkylphosphonium base, and a polyoxyethylene group.

In the stationary phase according to an embodiment of the present disclosure, from the standpoint of safety and separation performance, chemical bonds (covalent bonds) are formed between the carrier and the polymer. Exemplary production methods include any of the steps shown in (i) to (v) below.

Although it is possible, in a stationary phase for chromatography, to utilize physical bonds with the carrier to coat a polymer thereon, the polymer in such cases may leach out depending on the solvent, and so this is not a desirable method.

(i) radically copolymerizing a (meth)acrylic monomer having a hydrophilic group or a (meth)acrylamide monomer having a hydrophilic group with an inorganic carrier particle having a polymerizable functional group bonded thereto;

(ii) producing a polymer by radically polymerizing a (meth)acrylic monomer having a hydrophilic group or a (meth)acrylamide monomer having a hydrophilic group in the presence of a chain transfer agent having on an end thereof a crosslinkable silyl group; and silane coupling the resulting polymer on a surface of an inorganic carrier particle;

(iii) copolymerizing a (meth)acrylic monomer having a hydrophilic group or a (meth)acrylamide monomer having a hydrophilic group with a silane coupling agent having a polymerizable double bond, and silane coupling the resulting polymer on a surface of an inorganic carrier particle;

(iv) copolymerizing a silane coupling agent having a polymerizable double bond with a (meth)acrylic monomer having a hydrophilic group or a (meth)acrylamide monomer having a hydrophilic group in the presence of an inorganic carrier particle; and (v) introducing a chain transferring functional group onto a surface of an inorganic carrier particle, and radically polymerizing a (meth)acrylic monomer having a hydrophilic group or a (meth)acrylamide monomer having a hydrophilic group.

In all of these methods, it is possible to regulate the stereoregularity of the produced polymer by adjusting polymerization temperature, polymerization solvents, additives and the like for polymerization.

A production method including step (i) will be described.

The inorganic carrier particle (hereinafter, also simply referred to as carrier) to which is bonded a polymerizable functional group and which can be used in the production method including step (i) can be obtained by the following method.

The polymerizable functional group bonded to the carrier is exemplified by a radically polymerizable functional group. Illustrative examples include a vinyl group, an allyl group, an isopropenyl group, and an alkenyl group of 4 to 12 carbon atoms having a double bond at the o position. Of these, a vinyl group, an allyl group, and an isopropenyl group are preferred.

As the inorganic carrier particle, porous inorganic particles or non-porous inorganic particles are used. Suitable carriers for porous inorganic particles include silica gel, alumina, zirconia, titania, magnesia, glass, kaolin, titanium oxide, silicate, and hydroxyapatite. Preferred porous inorganic particles are silica gel, alumina, or glass.

Suitable carriers for non-porous inorganic particles include non-porous silica gel and non-porous titanium oxide.

When a porous silica gel or a non-porous silica gel (hereinafter, also simply referred to as "silica gel" as a concept including both) is used as the carrier, the polymerizable functional group described above is chemically bonded to the carrier via silanol groups on the silica gel.

When a carrier other than a porous silica gel or a non-porous silica gel is used, by carrying out surface treatment of the carrier, excess adsorption of the substances to be separated by the carrier itself can be suppressed. Further, polymerizable functional group via the groups introduced in the surface treatment can be bonded to the carrier. Examples of surface treatment agents include silane coupling agents such as aminopropylsilane and titanate or aluminate-type coupling agents.

When a porous silica gel is used as the carrier, this may be a core-shell type silica gel that is referred to as "core shell" or "peripheral", in which the core is non-porous and only the surface layer has been made porous.

When a core-shell type carrier (also referred to as core-shell particle) is used, it is possible to use the one to be described later.

The carrier to which such polymerizable functional group is bonded is obtained by, for example, silane coupling a compound represented by Formula (I) below with a carrier, preferably silica gel.

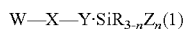

(In Formula (I), W is a vinyl group, an allyl group, an isopropenyl group, or an alkenyl group of 4 to 12 carbon atoms having a double bond at the o position; X is an amide group, an ester group, an N-alkylamide group of 1 to 3 carbon atoms, an ether group, a sulfoxide group, a sulfone group, a sulfide group, or a phosphate ester group; Y is an alkylene group of 1 to 30 carbon atoms; each R is independently an alkyl group of 1 to 3 carbon atoms; Z is a leaving group that can form a bond between the silicon atom in Formula (I) and the carrier; and n is an integer from 1 to 3.)

In Formula (I) above, W is preferably a vinyl, allyl, or isopropenyl group.

In Formula (I) above, X is part of the linker between W and the terminal Z group, and is preferably an amide group, an N-alkylamide group of 1 to 3 carbon atoms, or an ester group.

Y in Formula (I) above is preferably an alkylene of 1 to 5 carbon atoms, and is more preferably a methylene group, an ethylene group, or a trimethylene group.

R in Formula (I) above is preferably a methyl group or an ethyl group.

Z in Formula (I) above is a leaving group, and can be any atomic group that can form a bond between the silicon atom in Formula (I) and a constituent atom such as oxygen of the carrier. For a good balance between ease of handling and reactivity, an alkoxy group of 1 to 5 carbon atoms can generally be used, with the use of a methoxy group or an ethoxy group being especially preferred. Illustrative examples include halogens (chlorine, bromine, or iodine), alkylmercaptyl groups of 1 to 20 carbon atoms, nitrogen-containing groups such as dimethylamino, diethylamino, pyrrolidino and imidazolyl groups, and allyl or 2-methyl-2-propenyl groups. The reaction conditions (including catalyst addition) can be adjusted according to the type of leaving group.

The compound of Formula (I) above can be obtained by reacting a compound having the structure represented by W in Formula (I) above with a compound having the —Y—SiR$_{3-n}$Z$_n$ structure in Formula (I) above.

The "—X—" moiety in Formula (I) above is formed by a reaction between these compounds.

The compound having the structure represented by W is exemplified by acrylic acid in which the hydrogen on the carbon bonded to the vinyl group can be substituted with an alkyl group of 1 to 12 carbon atoms, or a halide of an acrylic acid in which the hydrogen on the carbon bonded to the vinyl group can be substituted with an alkyl group of 1 to 12 carbon atoms.

The compound having the —Y—SiR$_{3-n}$Z$_n$ structure in Formula (I) above is exemplified by silane coupling agents having a group that is the precursor of the above-described X moiety and having an alkoxy group of 1 to 5 carbon atoms as a leaving group.

The carrier to which is bonded a polymerizable functional group that is used in the present disclosure is preferably a surface-modified silica gel obtained by silane coupling the compound represented by Formula (I) above with silica gel.

When the stationary phase according to an embodiment of the present disclosure is produced by the production method including step (i) described above, it can be obtained by copolymerizing a (meth)acrylic monomer having a hydrophilic group or a (meth)acrylamide monomer having a hydrophilic group with a carrier to which a polymerizable functional group is bonded.

Such copolymerization may involve, for example, inducing copolymerization for both the (meth)acryloyl groups of the monomer and the polymerizable functional group. A known method can be used for the reaction conditions for this case.

An example of the (meth)acrylic monomer having a hydrophilic group or the (meth)acrylamide monomer having a hydrophilic group is a monomer represented by Formula (1) below.

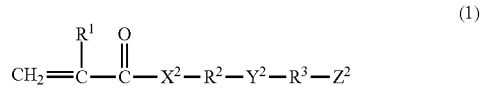

In Formula (1),
R$^1$ is hydrogen or an alkyl of 1 to 6 carbon atoms;
R$^2$ is a single bond or an alkylene of 1 to 12 carbon atoms;
R$^3$ is a single bond or an alkylene of 1 to 6 carbon atoms;
X$^2$ is —O—, —NH—, or —N(CH$_3$)—,
Y$^2$ is a single bond,

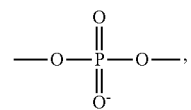

—N$^+$H$_2$—, —N$^+$(R$^4$)$_2$—, or

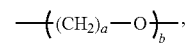

a is an integer of 1 to 5, and b is an integer of 1 to 20;
Z$^2$ is hydrogen, alkyl of 1 to 6 carbon atoms, halogen, —N$^+$R$_3^4$,

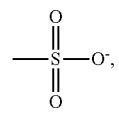

—CO$_2^-$, or

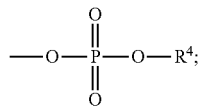

R$^4$ is hydrogen, an alkyl of 1 to 6 carbon atoms, or a hydroxyalkyl of 1 to 6 carbon atoms.

In Formula (1), when X$^2$ is —O— and Y$^2$ is

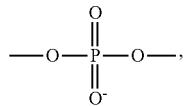

a monomer represented by Formula (2) below can be preferable.

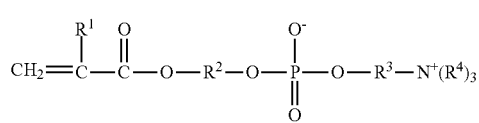

In Formula (2), R$^1$ is hydrogen or methyl; and R$^2$ is methylene, ethylene, propylene, butylene, pentylene, or hexylene, and is preferably methylene or ethylene; R$^3$ is methylene, ethylene, propylene, butylene, pentylene, or hexylene, and is preferably methylene or ethylene; and R$^4$ is methyl or ethyl, and is preferably methyl.

Specific examples of the monomer represented by Formula (2) above include 2-((meth)acryloyloxy)ethyl-2'-(trimethylammonio)ethyl phosphate, 3-((meth)acryloyloxy)propyl-2'-(trimethylammonio)ethyl phosphate, 4-((meth)acryloyloxy)butyl-2'-(trimethylammonio)ethyl phosphate, 5-((meth)acryloyloxy)pentyl-2'-(trimethylammonio)ethyl phosphate, 6-((meth)acryloyloxy)hexyl-2'-(trimethylammonio)ethyl phosphate, 2-((meth)acryloyloxy)ethyl-2'-(triethylammonio)ethyl phosphate, 2-((meth)acryloyloxy)ethyl-2'-(tripropylammonio)ethyl phosphate, 2-((meth)acryloyloxy)ethyl-2'-(tributylammonio)ethyl phosphate, 2-((meth)acryloyloxy)ethyl-2'-(tricyclohexylammonio)ethyl phosphate, 2-((meth)acryloyloxy)ethyl-2'-(triphenylammonio)ethyl phosphate, 2-((meth)acryloyloxy)propyl-2'-(trimethylammonio)ethyl phosphate, 2-((meth)acryloyloxy)butyl-2'-(trimethylammonio)ethyl phosphate, 2-((meth)acryloyloxy)pentyl-2'-(trimethylammonio)ethyl phosphate, and 2-((meth)acryloyloxy)hexyl-2'-(trimethylammonio)ethyl phosphate. Of these, 2-((meth)acryloyloxy)ethyl-2'-(trimethylammonio)ethyl phosphate (2-methacryloyloxyethyl phosphorylcholine: hereinafter, also abbreviated as "PA") is preferably used in terms of availability.

In Formula (1), when X$^2$ is —O—, —NH—, or —N(CH$_3$)—, and Y$^2$ is —N$^+$(R$^4$)$_2$—, a monomer represented by Formula (3) below can be preferable.

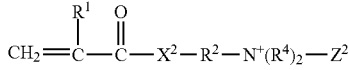

In Formula (3), R$^1$ is hydrogen or methyl; R$^2$ is an alkylene of 1 to 12 carbon atoms; R$^4$ is hydrogen, methyl, or ethyl; and Z$^2$ is the same group as R$^4$. X– is a fluoride, chloride, bromide, or iodide.

Specific examples of the monomer represented by formula (3) above include methacryloylaminomethyltrimethylammonium chloride, 2-(methacryloylamino)ethyltrimethylammonium chloride, 3-(methacryloylamino)propyltrimethylammonium chloride, 4-(methacryloyl)amino)butyltrimethylammonium chloride, 5-(methacryloylamino)pentyltrimethylammonium chloride, 6-(methacryloylamino)hexyltrimethylammonium chloride, methacryloylaminomethyltrimethylammonium bromide, 2-(methacryloylamino)ethyltrimethylammonium bromide, 3-(methacrylamino)propyltrimethylammonium bromide, 4-(methacrylamino)butyltrimethylammonium bromide, 5-(methacrylamino)pentyltrimethylammonium bromide, 6-(methacylamino)hexyltrimethylammonium bromide, methacryloylaminomethyltrimethylammonium iodide, 2-(methacryloylamino)ethyltrimethylammonium iodide, 3-(methacryloylamino)propyltrimethylammonium iodide, 4-(methacryloylamino)butyltrimethylammonium iodide, 5-(methacryloylamino)pentyltrimethylammonium iodide, 6-(methacloylamino)hexyltrimethylammonium iodide, methacryloyloxymethyltrimethylammonium chloride, 2-(methacryloyloxy)ethyltrimethylammonium chloride, 3-(methacryloyloxy)propyltrimethylammonium chloride, 4-(methacryloyloxy)butyltrimethylammonium chloride, 5-(methacryloyloxy)pentyltrimethylammonium chloride, 6-(methacryloyloxy)hexyltrimethylammonium chloride, methacryloyloxymethyltrimethylammonium bromide, 2-(methacryloyloxy)ethyltrimethylammonium bromide, 3-(methacryloyloxy)propyltrimethylammonium bromide, 4-(methacryloyloxy)butyltrimethylammonium bromide, 5-(methacryloyloxy)pentyltrimethylammonium bromide, 6-(methacryloyloxy)hexyltrimethylammonium bromide, methacryloyloxymethyltrimethylammonium iodide, 2-(methacryloyloxy)ethyltrimethylammonium iodide, 3-(methacryloyloxy)propyltrimethylammonium iodide, 4-(methacryloyloxy)butyltrimethylammonium iodide, 5-(methacryloyloxy)pentyltrimethylammonium iodide and 6-(methacryloyloxy)hexyltrimethylammonium iodide.

In Formula (1), when Y$^2$ is —N$^+$(R$^4$)$_2$—, a monomer represented by Formula (4) below can be preferable.

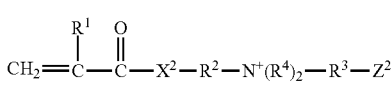

In Formula (4), X$^2$ is —O—, —NH—, or—N(CH$_3$)—; R$^1$ is hydrogen or methyl; R$^2$ is an alkylene group having 1 to 12 carbon atoms; R$^3$ is an alkyl group having 1 to 12 carbon atoms; Z$^2$ is

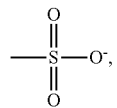

—$CO_2$—, or

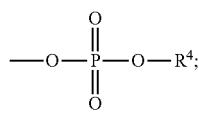

and $R^4$ is hydrogen, alkyl of 1 to 6 carbon atoms, or hydroxyalkyl of 1 to 6 carbon atoms.

Specific examples of the monomer represented by Formula (4) above include 2-(N-3-sulfopropyl-N,N-dimethylammonium)ethyl methacrylate, 2-(N-3-sulfopropyl-N,N-dimethylammonium)ethyl methacrylamide, 3-[[2-(methacryloyloxy)ethyl]dimethylammonio]propionate, and 3-[[2-(methacrylamide)ethyl]dimethylammonio]propionate.

In Formula (1), when $Y^2$ is

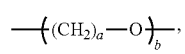

a monomer represented by Formula (5) below can be preferable.

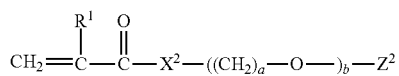

(5)

In Formula (5), $X^2$ is —O—, —NH—, or —N($CH_3$)—; $R^1$ is hydrogen or methyl; a is an integer from 1 to 5; b is an integer from 1 to 20; and $Z^2$ is preferably hydrogen, methyl, or ethyl.

Specific examples of the monomer represented by Formula (5) above include 2-hydroxyethyl methacrylate, diethylene glycol monomethacrylate, diethylene glycol monomethyl ether methacrylate, diethylene glycol monoethyl ether methacrylate, triethylene glycol monomethacrylate, triethylene glycol monomethyl ether methacrylate, triethylene glycol monoethyl ether methacrylate, tetraethylene glycol monomethacrylate, tetraethylene glycol monomethyl ether methacrylate, tetraethylene glycol monoethyl ether methacrylate, polyethylene glycol monomethacrylate, polyethylene glycol monomethyl ether methacrylate, polyethylene glycol monoethyl ether methacrylate, 2-hydroxyethyl methacrylamide, diethylene glycol monomethacrylamide, diethylene glycol monomethyl ether methacrylamide, diethylene glycol monoethyl ether methacrylamide, triethylene glycol monomethacrylamide, triethylene glycol monomethyl ether methacrylamide, triethylene glycol monoethyl ether methacrylamide, tetraethylene glycol monomethacrylamide, tetraethylene glycol monomethyl ether methacrylamide, tetraethylene glycol monoethyl ether methacrylamide, polyethylene glycol monomethacrylamide, polyethylene glycol monomethyl ether methacrylamide, polyethylene glycol monoethyl ether methacrylamide, 2-hydroxyethyl acrylate, diethylene glycol monoacrylate, diethylene glycol monomethyl ether acrylate, diethylene glycol monoethyl ether acrylate, triethylene glycol monoacrylate, triethylene glycol monomethyl ether acrylate, triethylene glycol monoethyl ether acrylate, tetraethylene glycol monoacrylate, tetraethylene glycol monomethyl ether acrylate, tetraethylene glycol monoethyl ether acrylate, polyethylene glycol monoacrylate, polyethylene glycol monomethyl ether acrylate, polyethylene glycol monoethyl ether acrylate, 2-hydroxyethyl acrylamide, diethylene glycol monoacrylamide, diethylene glycol monomethyl ether acrylamide, diethylene glycol monoethyl ether acrylamide, triethylene glycol monoacrylamide, triethylene glycol monomethyl ether acrylamide, triethylene glycol monoethyl ether acrylamide, tetraethylene glycol monoacrylamide, tetraethylene glycol monomethyl ether acrylamide, tetraethylene glycol monoethyl ether acrylamide, polyethylene glycol monoacrylamide, polyethylene glycol monomethyl ether acrylamide, and polyethylene glycol monoethyl ether acrylamide.

In Formula (1), when $Z^2$ is

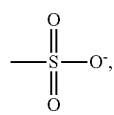

a monomer represented by Formula (6) below can be preferable.

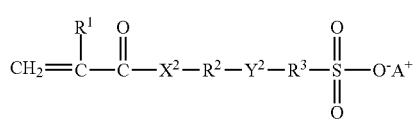

(6)

In Formula (6), $X^2$ is —O—, —NH—, or —N($CH_3$)—; $R^1$ is hydrogen or methyl; $R^2$ is an alkylene group having from 1 to 12 carbon atoms; $Y^2$ is a single bond; $R^3$ is an alkyl group of 1 to 12 carbon atoms; $Z^2$ is

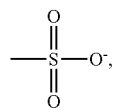

—$CO_2$—, or

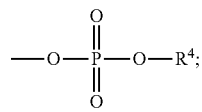

$R^4$ is hydrogen, an alkyl of 1 to 6 carbon atoms, or a hydroxyalkyl of 1 to 6 carbon atoms; and A is an element that is a counterion, and is lithium, sodium, potassium, or cesium.

Specific examples of the monomer represented by formula (6) above include lithium 3-(methacryloyloxy) propane sulfonate, sodium 3-(methacryloyloxy) propane sulfonate, potassium 3-(methacryloyloxy) propane sulfonate, cesium 3-(methacryloyloxy) propane sulfonate, lithium 3-(methacrylamide) propane sulfonate, sodium 3-(methacrylamido) propane sulfonate, potassium 3-(methacrylamide) propane sulfonate, cesium 3-(methacrylamide) propane sulfonate, lithium 3-(N-methylmethacrylamide) propane sulfonate, sodium 3-(N-methylmethacrylamide) propane sulfonate, potassium 3-(N-methylmethacrylamide) propane sulfonate, cesium 3-(N-methylmethacrylamide) propane sulfonate, lithium 3-(acryloyloxy) propane sulfonate, sodium 3-(acryloyloxy) propane sulfonate, potassium 3-(acryloyloxy) propane sulfonate, cesium 3-(acryloyloxy) propane sulfonate, lithium 3-(acrylamide) propane sulfonate, sodium 3-(acrylamide) propane sulfonate, potassium 3-(acrylamide) propane sulfonate, cesium 3-(acrylamide) propane sulfonate, lithium 3-(N-methylacrylamide) propane sulfonate, sodium 3-(N-methylacrylamide) propane sulfonate, potassium 3-(N-methylacrylamide) propane sulfonate, cesium 3-(N-methylacrylamide) propane sulfonate, lithium 2-(methacryloyloxy) ethane sulfonate, sodium 2-(methacryloyloxy) ethane sulfonate, potassium 2-(methacryloyloxy) ethane sulfonate, cesium 2-(methacryloyloxy) ethane sulfonate, lithium 2-(methacrylamido) ethane sulfonate, sodium 2-(methacrylamide) ethane sulfonate, potassium 2-(methacrylamide) ethane sulfonate, cesium 2-(methacrylamide) ethane sulfonate, lithium 2-(N-methylmethacrylamide) ethane sulfonate, sodium 2-(N-methylmethacrylamide) ethane sulfonate, potassium 2-(N-methylmethacrylamide) ethane sulfonate, cesium 2-(N-methylmethacrylamide) ethane sulfonate, lithium 2-(acryloyloxy) ethane sulfonate, sodium 2-(acryloyloxy) ethane sulfonate, potassium 2-(acryloyloxy) ethane sulfonate, cesium 2-(acryloyloxy) ethane sulfonate, lithium 2-(acrylamide) ethane sulfonate, sodium 2-(acrylamide) ethane sulfonate, potassium 2-(acrylamide) ethane sulfonate, cesium 2-(acrylamide) ethane sulfonate, lithium 2-(N-methylacrylamide) ethane sulfonate, sodium 2-(N-methylacrylamide) ethane sulfonate, potassium 2-(N-methylacrylamide) ethane sulfonate, and cesium 2-(N-methylacrylamide) ethane sulfonate.

In Formula (1), when $R^2$ and $R^3$ are single bonds, and $X^2$ is —NH—, a monomer represented by Formula (7) below can be preferable.

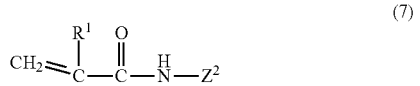

(7)

In Formula (7), R1 is hydrogen or an alkyl of 1 to 6 carbon atoms; and $Z^2$ is hydrogen or an alkyl of 1 to 6 carbon atoms.

Specific examples of the monomer represented by Formula (7) above include acrylamide, methacrylamide, N-methyl acrylamide, N-methyl methacrylamide, N-ethyl acrylamide, and N-ethyl methacrylamide.

The copolymerization conditions include radical copolymerization, and a small amount of a radical generator can be used as a catalyst to induce copolymerization. The radical generator can be a known radical generator that is used in polymerization reactions, and specific examples thereof include azo compounds and peroxides. The stationary phase according to an embodiment of the present disclosure obtained using the starting materials and the production method including step (i) described above presumably has the following structure.

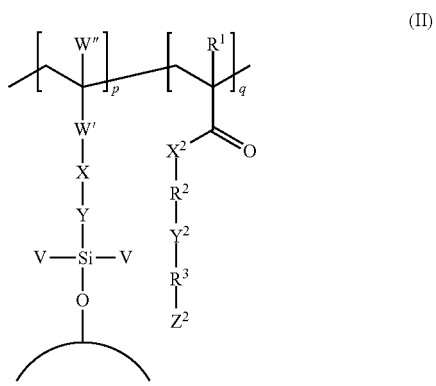

(II)

In Formula II, W' and W", which are derived from W in Formula (I), are groups that form by addition polymerization; X is an amide group, an ester group, an N-alkylamide group of 1 to 3 carbon atoms, an ether group, a sulfoxide group, a sulfone group, a sulfide group, or a phosphate ester group; Y is an alkylene group of 1 to 30 carbon atoms; V is an ether group bonded to the silica gel surface, or an unreacted Z group shown in Formula (I) above, or an R group; and $X^2$, $Y^2$, $Z^2$, $R^1$, $R^2$, and $R^3$ are the same as those described in Formula (1) above.)

In Formula (II) above, specific examples of W' include a single bond and an alkylene group of 1 to 10 carbon atoms which may have a branched chain. Preferred examples thereof include a single bond, a methylene group, an ethylene group, and a trimethylene group.

In Formula (II) above, specific examples of W" include hydrogen or an alkyl group of 1 to 12 carbon atoms.

Preferred groups of X and Y in Formula (II) can be the same as for Formula (I) above.

$X^2$, $Y^2$, $Z^2$, $R^1$, $R^2$, and $R^3$ in Formula (II) are the same as those described in Formula (1) above, and the preferred combinations of $X^2$ and $Y^2$ and the preferred structure generated thereby are the same as those described in Formulas (2) to (7) above.

In Formula (II), p can be from 1 to 10, and q can be from about 10 to about 3000. Here, p is preferably from 1 to 5, and q is preferably from 15 to 2500, and more preferably from 20 to 2000.

With regard to V in Formula (II), when n=1 in the compound of Formula (I) above, V=R; and when n=2, the ratio of the numbers of unreacted Z groups or R groups to the total number of V is from 50 to 100%; and when n=3, the ratio of the numbers of unreacted Z groups or R groups to the total number of V is from 0 to 100%.

$X^2$, $Y^2$, $Z^2$, $R^1$, $R^2$, and $R^3$ in Formula (II) are the same as those described in Formula (1) above, and specific examples thereof include those described in any of Formulas (2) to (7) above.

Next, a production method including step (ii) for obtaining the stationary phase according to an embodiment of the present disclosure will be described.

The production method including step (ii) includes radically polymerizing in the presence of a chain transfer agent having a terminal crosslinkable silyl group, and silane coupling the obtained polymer with a carrier surface.

The chain transfer agent having a terminal crosslinkable silyl group that is used in the production method including step (ii) is exemplified by compounds of formula (III) below. In the disclosure, "crosslinkable silyl group" refers to a silyl group to which is bonded a leaving group such as that indicated by Z in Formula (III) below. The same applies also to the compound used in other production methods below.

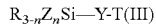
$R_{3-n}Z_nSi$—Y-T(III)

(In Formula (III), each R is independently an alkyl group of 1 to 5 carbon atoms; and Z is a leaving group that can form a bond between the silicon atom in Formula (III) and a carrier. Y is a single bond or an alkylene group of 1 to 30 carbon atoms, and T is a chain transferring functional group. n is an integer from 1 to 3.)

In Formula (III), R is preferably a methyl group, an ethyl group, or a propyl group. Z is a leaving group, and can be any atomic group that can form a bond between the silicon atom in Formula (III) and a constituent oxygen of the silica gel.

For a good balance between ease of handling and reactivity, alkoxy groups of 1 to 5 carbon atoms can generally be used as the leaving group; illustrative examples include methoxy and ethoxy groups. Halogens (chlorine, bromine, or iodine), nitrogen-containing groups such as dimethylamino, diethylamino, pyrrolidino, and imidazolyl groups, and allyl and isopropenyl groups can also be used. The reaction conditions (including catalyst addition) can be adjusted according to the type of leaving group. Y is more preferably a single bond or an alkylene group of 1 to 10 carbon atoms. T is a chain transferring functional group. "Chain transferring functional group" refers to a functional group which, in a polymerization reaction, leads vigorously to a chain transfer reaction accompanied by transfer of a growing active species and a re-initiation reaction. The presence of a chain transferring functional group means that it is possible to some extent to control the molecular weight and terminal structure of the obtained polymer. Preferred specific examples of the chain transferring functional group include halogenated alkyl groups of 1 to 12 carbon atoms, alkyl group of 1 to 12 carbon atoms having a thiol at the end, and alkyl groups of 1 to 12 carbon atoms having therein a disulfide group.

Examples of the halogen on the halogenated alkyl groups of 1 to 12 carbon atoms include chlorine, bromine, and iodine. These alkyl groups are exemplified by alkyl groups of 1 to 3 carbon atoms.

By carrying out radical polymerization on a (meth)acrylic monomer having a hydrophilic group or a (meth)acrylamide monomer having a hydrophilic group in the presence of such a chain transfer agent and using a small amount of a radical generator as a catalyst, a compound having a structure shown in formula (IV) below can be obtained. Here, it is possible to control the molecular weight to some degree using the molar ratio between the chain transfer agent and the monomer. The radical generator can be a known radical generator that is used in polymerization reactions, and specific examples thereof include azo compounds and peroxides. In addition to silica gel, it is possible to use as the carrier the same materials as can be used in the production method including step (i) above. The (meth)acrylic monomer having a hydrophilic group or the (meth)acrylamide monomer having a hydrophilic group can also be the same as those used in the production method including step (i). Further, it is also possible to use as the radical generator the same materials as can be used in the production method including step (i).

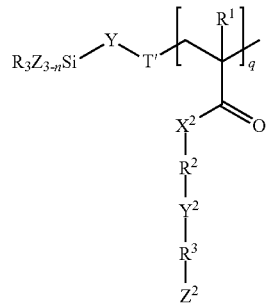

(In Formula (IV), T' is derived from T in Formula III and is a group that forms by a chain transfer reaction; and $X^2$, $Y^2$, $Z^2$, $R^1$, $R^2$, and $R^3$ are the same as those described in Formula (1) above. q is an integer of 2 to 300.)

$X^2$, $Y^2$, $Z^2$, $R^1$, $R^2$, and $R^3$ in Formula (IV) are the same as those described in Formula (1) above, and specific examples thereof include those described in any of Formulas (2) to (7) above.

When T is an alkyl group of 1 to 12 carbon atoms having a halogen bonded at the end, T' in Formula (IV) is an alkylene residue of 1 to 12 carbon atoms which is substituted with that halogen. When T is an alkyl group of 1 to 12 carbon atoms having a thiol at the end or an alkyl group of 1 to 12 carbon atoms having a disulfide group therein, T' is a thioether.

The carrier used in production method (ii) for the stationary phase according to an embodiment of the present disclosure can be the same as the carrier used in production method (i).

A known silane coupling method can be used as the method for coupling the compound of Formula (III) to the carrier by a silane coupling reaction.

The stationary phase according to an embodiment of the present disclosure obtained by the production method including step (ii) above presumably has a structure represented by Formula (V) below.

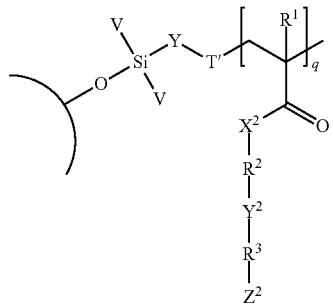

(In Formula (V), Y is a single bond or an alkylene group of 1 to 30 carbon atoms; when the inorganic carrier is silica gel, V is an ether group bonded to the silica gel surface, or an unreacted Z group shown in Formula (III) above, or an R group; T' is derived from T in Formula (III) and is a group that forms by a chain transfer reaction; and $X^2$, $Y^2$, $Z^2$, $R^1$, $R^2$, and $R^3$ are the same as those described in Formula (1) above, and specific examples thereof include those described in any of Formulas (2) to (7) above. q is an integer from 2 to 300.)

Next, a production method including step (iii) will be described.

This production method includes copolymerizing a silane coupling agent having a polymerizable double bond with a (meth)acrylic monomer having a hydrophilic group or a (meth)acrylamide monomer having a hydrophilic group, and silane coupling the resulting polymer on a carrier surface.

The silane coupling agent having a polymerizable double bond is exemplified by compounds of the structure represented by Formula (VI) below.

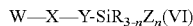

W—X—Y—SiR$_{3-n}$Z$_n$(VI)

(In Formula (VI), W is a vinyl group, an allyl group, an isopropenyl group, or an alkenyl group of 4 to 12 carbon atoms having a double bond at the (>position; X is an amide group, an ester group, an N-alkylamide group of 1 to 3 carbon atoms, an ether group, a sulfoxide group, a sulfone group, or a phosphate ester group; each R is independently an alkyl group of 1 to 5 carbon atoms; Z is a leaving group that can form a bond between the silicon atom in Formula (VI) and the carrier; Y is an alkylene group of 1 to 30 carbon atoms; and n is an integer from 1 to 3.)

Y in Formula (VI) above is preferably an alkylene of 1 to 5 carbon atoms, and is more preferably a methylene group, an ethylene group, or a trimethylene group.

R is preferably a methyl group or an ethyl group.

Z is a leaving group, and can be any atomic group that can form a bond between the silicon atom in Formula (VI) and, in cases where the carrier is, for example, silica gel, a constituent oxygen in the silica gel. Even in cases where the carrier is not silica gel, the leaving group is capable of forming a bond with a constituent atom of the carrier.

For a good balance between ease of handling and reactivity, alkoxy groups of 1 to 5 carbon atoms can generally be used as the leaving group; illustrative examples include methoxy and ethoxy groups. Use can also be made of halogens (chlorine, bromine, or iodine), nitrogen-containing groups such as dimethylamino, diethylamino, pyrrolidino, and imidazolyl groups, and allyl and isopropenyl groups. The reaction conditions (including catalyst addition) can be adjusted according to the type of leaving group.

In the production method including step (iii) above as well, in addition to silica gel, it is possible to use as the carrier the same materials as can be used in the production method including steps (i) and (ii) above. The (meth)acrylic monomer having a hydrophilic group or the (meth)acrylamide monomer having a hydrophilic group can also be the same as those used in the production method including steps (i) and (ii).

The copolymerization conditions include radical copolymerization, and a small amount of a radical generator can be used as a catalyst to induce copolymerization. It is possible to use as the radical generator the same materials as can be used in production method (i). In this production method, regulation of the molecular weight is possible by using a suitable chain transfer agent and the above-described living radical polymerization process when synthesizing the polymer. A known silane coupling method can be used as the method for coupling the resulting polymer with the carrier by a silane coupling reaction.

The stationary phase according to an embodiment of the present disclosure obtained by the production method including step (iii) above presumably has the structure represented by Formula (II) above.

Next, a production method including step (iv) will be described.

This production method includes copolymerizing a silane coupling agent having a polymerizable double bond with a (meth)acrylic monomer having a hydrophilic group or a (meth)acrylamide monomer having a hydrophilic group in the presence of a carrier.

In this production method, a compound having a structure represented by Formula (VI) used in the production method including step (iii) above can be used as the silane coupling agent having a polymerizable double bond.

Further, in addition to silica gel, it is possible to use as the carrier the same materials as can be used in the production method including steps (i) and (ii) above. The (meth)acrylic monomer having a hydrophilic group or the (meth)acrylamide monomer having a hydrophilic group can also be the same as those used in the production method including steps (i) and (ii).

The copolymerization conditions include radical copolymerization, and a small amount of a radical generator can be used as a catalyst to induce copolymerization. The radical generator can be a known radical generator that is used in polymerization reactions, and specific examples thereof include azo compounds and peroxides.

The stationary phase according to an embodiment of the present disclosure obtained by the production method including step (iv) above presumably has the structure represented by Formula (II) above.

Next, a production method including step (v) will be described. This production method includes introducing a chain transferring functional group to a carrier surface, and radically polymerizing a (meth)acrylic monomer having a hydrophilic group or a (meth)acrylamide monomer having a hydrophilic group. The chain transferring functional group is exemplified by the same as those exemplified in the description of Formula (III), and preferred examples are also the same.

In this production method, the carrier to which the chain transferring functional group is bonded can be obtained by silane coupling a compound having the structure of Formula (III), which is used in the production method including step (ii) above, with silica gel (in cases where silica gel is used as the carrier).

By carrying out the radical polymerization of a (meth) acrylic monomer having a hydrophilic group or a (meth) acrylamide monomer having a hydrophilic group in the presence of a carrier onto the surface of which chain transferring functional groups have been introduced (chemically bonded) and using a small amount of a radical generator as a catalyst, it is possible to immobilize a polymer on the carrier surface. In addition to silica gel, it is possible to use as the carrier the same materials as can be used in the production method including steps (i) and (ii) above. The (meth)acrylic monomer having a hydrophilic group or the (meth)acrylamide monomer having a hydrophilic group can also be the same as those used in the production method including steps (i) and (ii). Further, it is also possible to use as the radical generator the same materials as can be used in the production method including steps (i) and (ii).

The stationary phase according to an embodiment of the present disclosure obtained by the production method including step (v) above presumably has the structure represented by Formula (V) above.

Stationary phases obtained by the production method including any of steps (i) to (v) above also have excellent performances as stationary phases for supercritical fluid chromatography.

The polymer obtained through the above operations, which is bonded to the carrier of the stationary phase according to an embodiment of the present disclosure and has a hydrophilic group on repeating units of the main chain thereof, has a weight-average molecular weight of preferably 1000 or greater and 5000000 or less. As used herein, "weight-average molecular weight" refers to that of the —(CH$_2$-CAB)$_n$-sites which, in the case of structures represented by, for example, above Formula (II) or (IV), are the repeating units of the main chain thereof.

From such standpoints as the solubility of the polymer in solvent, prevention of particle agglomeration when the polymer is carried by the carrier, suppression of dissolution in the mobile phase solvent, and maintaining the bonded amount of polymer when chemically bonded to the carrier, the weight-average molecular weight is preferably in the above range. The optimum weight-average molecular weight differs depending on the type of polymer.

However, in the production method including steps (i), (iv), and (v), because polymerization of the monomer having a hydrophilic group and immobilization on the silica gel occur at the same time, the weight-average molecular weight is estimated from the polymerization solution supernatant.

In the production method including steps (ii) and (iii), before bonding the polymer having a hydrophilic group on repeating units of the main chain thereof to the carrier, the weight-average molecular weight of the polymer is measured.

The weight-average molecular weight can be measured by gel permeation chromatography (GPC) using polystyrene, poly(methyl methacrylate), or poly(ethylene glycol) as the reference substance.

In the stationary phase according to an embodiment of the present disclosure, because the polymer having a hydrophilic group on repeating units of the main chain thereof is covalently bonded to the carrier surface, even when a solvent inherently capable of dissolving the polymer, or a mixed solvent containing the same, is used as the developing solvent, the polymer does not dissolve and thus its function as a stationary phase is not impaired.

Because the specific surface area of the stationary phase according to an embodiment of the present disclosure corresponds to the specific surface area of the carrier used, a carrier having the desired specific surface area may be selected. When the carrier is, for example, a porous inorganic particle which includes porous silica gel as an option, the specific surface area can be adjusted by choosing a suitable product. Generally, in cases where the polymer is carried by a carrier, a change in specific surface area greater than that attributable to error does not occur before and after the polymer is carried; hence, the specific surface area of the stationary phase can be regarded as identical to the specific surface area of the carrier used.

When a core-shell particle is used as the carrier, the specific surface area thereof corresponds to the specific surface area of the shell.

The average particle size of the carrier that can be used in the present disclosure is typically 0.1 µm or greater and 50 µm or less, in another aspect, 1 µm or greater and 40 µm or less, in yet another aspect, 1 µm or greater and 30 µm or less, in yet another aspect, 1 µm or greater and 5 µm or less, and in yet another aspect, 1 µm or greater and 3 µm or less. The average pore size is typically 10 Å or greater and 10000 Å or less, in another aspect, 50 Å or greater and 1000 Å or less, and in yet another aspect, 100 Å or greater and 1000 Å or less.

In the case of porous inorganic particles including porous silica gel as an option, the specific surface area of the carrier is typically 5 m$^2$/g or greater and 1000 m$^2$/g or less, and in another aspect, 10 m$^2$/g or greater and 500 m$^2$/g or less. On the other hand, in the case of non-porous inorganic particles including non-porous silica gel as an option, the specific surface area thereof is typically less than 5 m$^2$/g, in another aspect, 4 m$^2$/g or less, and typically 0.01 m$^2$/g or greater. Generally, in cases where the polymer is carried by a carrier, a change in specific surface area greater than that attributable to error does not occur before and after the polymer is carried; hence, the average particle size of the stationary phase can be regarded as identical to the average particle size of the carrier used. That is, in cases where the stationary phase of the present disclosure is particulate, the average particle size thereof is 0.1 µm or greater and 1000 µm or less, typically 0.1 µm or greater and 50 µm or less, and in another aspect, 1 µm or greater and 50 µm or less.

The polymer carried by the carrier has an average thickness (carrying amount per gram of carrier/specific surface area of carrier) of typically preferably 0.5 nm or greater and 5 nm or less. In this range, the peak has a tendency to be sharp, which is preferable.

On the other hand, in the embodiment of the present disclosure, a core-shell particle having a non-porous core and a porous shell on the outer surface thereof can be used as the carrier. The core-shell particles as used herein is classified as porous inorganic particles. Core-shell particles having a shell with an average pore diameter of 9 nm or greater, and also 30 nm or greater can be used. The average pore diameter of the shell is typically 300 nm or less.

It is expected that giving the shell of the core-shell particle an average pore diameter of 9 nm or greater, and in another aspect, 30 nm or greater will cause the ligand material to penetrate into the shell of the core-shell particle, which contributes to good separation of target substances.

The average pore diameter of the shell of the core-shell particle can be measured by the gas adsorption technique.

The gas adsorption technique is a method in which vapor is adsorbed by varying pressure on a porous sample, the amount of adsorption at that time is measured, and the specific surface area, pore volume, pore distribution, and the like are calculated from the absorption/desorption isothermal curves plotted with the relative pressure (=the ratio of the pressure in the adsorption equilibrium state and the saturated vapor pressure) and the adsorbed amount. The standards of JIS Z8831-2 (mesopores and macropores) or JIS Z8831-3 (micropores), which has been established for pore size distribution and pore characteristics of powder (solid), are applicable to this technique.

Here, "non-porous" used herein means that when the specific surface area (m$^2$/g) of the surface of the core particles determined by the BET method is expressed by A and the surface area (m$^2$/g) thereof per unit weight that can be calculated from the surface area ($4\pi r^2$, which is calculated from the particle radius r) determined from the particle size of the core particles is expressed by B, then the value of (A−B)/B×100 is less than 20.

Meanwhile, "porous" used herein means the specific surface area of the surface of the material, determined by the BET method, is 10 mm$^2$/g or greater. The thickness ratio of the cores to the shells of the core-shell particle is typically from 1:9 to 9:1. This ratio is preferably from 4:1 to 2:1 from the standpoint of ensuring good separation characteristics for a target substance. This ratio can be controlled by adjusting the thickness of the shell layer of the core-shell particle as described below.

Here, "thickness of a core" refers to the diameter of the core.

The material of the core as a constituent component of the core-shell particle is an inorganic substance. Specific examples thereof include non-porous particles selected from materials represented by glasses, metals such as titanium and zirconium, oxides of these metals, and clay minerals such as bentonite and mica.

The average particle size of the core-shell particle is typically 0.1 μm or greater and 10 μm or less, preferably from 1 μm to 5 μm, and even more preferably from 1 μm to 3 μm. In the present disclosure, the particle size of the core-shell particle refers to a particle size measured by an average particle size measurement method using centrifugal sedimentation.

The material of the shell as a constituent component of the core-shell particle is obtained by partially hydrolyzing an alkoxysilane and further hydrolyzing the resultant polyalkoxysiloxane. Such material is preferred from the standpoint that the core-shell particle can be easily produced.

Preferred as the alkoxysilane are tetraalkoxysilanes. Preferred of these are tetramethoxylane, tetraethoxysilane, tetrapropoxysilane, and tetrabutoxysilane. Use of tetraethoxysilane is more preferred.

For production of the core-shell particle, JP 49-36396 can be referred to. Specifically, an alkoxysilane is first partially hydrolyzed to yield a polyalkoxysiloxane. The polyalkoxysiloxane thus obtained is dissolved in a solvent such as an ether, acetone, or dichloromethane to prepare a polyalkoxysiloxane solution. This solution is applied to particles serving as the cores, or the core particles are immersed in this solution. Thereafter, the solvent is removed to deposit the polyalkoxysiloxane as shells on the surfaces of the core particles. Subsequently, the deposited polyalkoxysiloxane is subjected to condensation polymerization (hydrolyzed) in the presence of water. Thus, core-shell particles can be obtained.

The thickness of the shell as a constituent component of the core-shell particle can be controlled, as appropriate, in the range of 0.1 to 100 μm. An example of methods therefor is to regulate the viscosity of the alkoxysilane which becomes the shell. For example, in cases where a shell having an increased thickness is to be formed, the viscosity of the alkoxysilane is lowered.

Examples of methods for controlling the specific surface area and pore diameter of the shell include a method in which the pH of the aqueous solution to be used for deposition and condensation polymerization of the shell is regulated. For example, the pH of the aqueous solution is thought to be increased when a larger specific surface area and a larger pore diameter are to be obtained.

Here, "thickness of a shell" refers to the value obtained by subtracting the diameter of the core from the diameter of the core-shell particle and dividing the obtained value by 2.

A commercially available "core-shell silica gel" may also be used for this core-shell particle. Such a commercial product has a pore diameter, specific surface area, and particle size within the aforementioned ranges as catalog values. In the case of a commercial core-shell silica gel, it is possible to use a product in which the core is made of glass and the shell is made of silica gel (polyalkoxysiloxane hydrolysate).

A commercially available "core-shell silica gel" may also be used for this core-shell particle. Such a commercial product has a pore diameter, specific surface area, and particle size within the aforementioned ranges as catalog values.

In a stationary phase having a polymer carried by a carrier, the ratio (%) in parts by mass of polymer included per 100 parts by mass of the stationary phase is preferably from 1 to 50 mass %, more preferably from 3 to 30 mass %, and even more preferably from 5 to 30 mass %. This ratio is desirable because excessively strong retention and broadening of the peak can be avoided while yet enabling the adsorptive ability of the polymer to be suitably manifested.

The ratio (%) of the parts by mass of polymer included per 100 parts by mass of the stationary phase can be measured by elemental analysis. The parts by mass ratio of polymer in the stationary phase is calculated based on measurement results for the carbon content of the carrier prior to bonding of the polymer and the carbon content of the resulting stationary phase, and under the assumption that all carbon aside from that included in the carrier prior to bonding of the polymer is derived from the polymer.

In cases where the stationary phase of the present disclosure is particulate, the average particle size indicates the diameter when the particles are spherical, and indicates the diameter of a sphere of equivalent particle volume when the particles are of irregular shape. The average particle size can be measured with an apparatus that carries out measurement using microscopic images, such as the Mastersizer 2000E available from Malvern Instruments Ltd.

In cases where the stationary phase of the present disclosure is particulate, the particles are preferably spherical particles having an aspect ratio of 2 or less, and preferably 1.5 or less. Particles that are closer to being truly spherical are more desirable, and thus the aspect ratio has no particular lower limit down to 1.

The aspect ratio is measured as follows. The sample is placed on an observation stage in a randomly scattered state and examined from directly above with an electron microscope or an optical microscope. In a random image in which ten or more independent primary particles (that is, primary particles not touching or overlapping with any other particles) are observed, the major axis and minor axis (length of longest portion perpendicular to major axis) of each independent primary particle in the image are determined, and the ratio of the two is treated as the aspect ratio for the individual particles. The arithmetic mean of the aspect ratios for all the independent primary particles in the image is treated as the aspect ratio in the present disclosure. Here, "primary particles" refers to particles for which the interfaces between particles are clearly observable. Observation is generally carried out after suitable dispersion on a sample stage so as to avoid overlapping of the primary particles. However, incidental overlap can be difficult to be avoided and bulk particles formed by the agglomeration of a plurality of primary particles may be present. These instances are excluded from observation.

The stationary phase according to an embodiment of the present disclosure is preferably used as a stationary phase for supercritical fluid chromatography (SFC).

When the stationary phase according to an embodiment of the present disclosure is used for SFC, it has excellent separation characteristics for hydrophilic materials.

The stationary phase according to an embodiment of the present disclosure can be packed into columns for supercritical fluid chromatography, such as those described in JP 2006-058147, and used.

In supercritical fluid chromatography, a fluid containing a supercritical fluid and a solvent is used as the mobile phase. Here, "supercritical fluid chromatography" is a general term for chromatography in which a supercritical fluid serves as the primary mobile phase. The supercritical fluid is a substance in a state at or above a critical pressure and at or above a critical temperature (i.e., a supercritical state).

Examples of substances that can be used as supercritical fluids include carbon dioxide, ammonia, sulfur dioxide, hydrogen halides, nitrous oxide, hydrogen sulfide, methane, ethane, propane, butane, ethylene, propylene, halogenated hydrocarbons, and water. However, in terms of suitable critical conditions, safety, cost, and other considerations, the supercritical fluid refers substantially to carbon dioxide. Nor is it strictly necessary for the fluid to be supercritical, with "supercritical fluid chromatography" also encompassing use in a subcritical state.

The solvent is one, two or more solvents selected from among various known solvents depending on the types of target substances, the type of supercritical fluid, and the like. Examples of the solvent include lower alcohols such as methanol, ethanol, and 2-propanol, ketones such as acetone, acetonitrile, ethyl acetate, and THF.

The foregoing supercritical fluid chromatography is not particularly limited, so long as it is chromatography that uses as the mobile phase a fluid which includes the above supercritical fluid and the above solvent. The supercritical fluid chromatography that uses the stationary phase according to an embodiment of the present disclosure may be used for analysis or for fractionation.

Supercritical fluid chromatography for fractionation is not particularly limited, so long as it is supercritical fluid chromatography that includes separately collecting with a fraction collector, according to the target substances to be separated in the column, the mobile phase after it has passed through the column.

A column of a known size can be used as the column to be packed.

A suitably adjusted flow rate can be used. For example, the flow rate can be from 0.3 to 10 mL/min, and preferably from 1 to 6 mL/min.

The column temperature can be from about 0° C. to about 50° C., and preferably from about 20° C. to about 40° C.

The back pressure can be from about 120 to 180 bar, and preferably from about 130 to 160 bar.

The stationary phase for supercritical fluid chromatography of the present disclosure has excellent separation performance for hydrophilic substances such as water-soluble vitamins, amino acids, sugars, nucleic acids, and hydrophilic metabolites.

EXAMPLES

The present disclosure will be described more concretely below with reference to examples. However, the present disclosure is not limited to the embodiments in the following examples.

Preparation Example 1

(N-Methyl-N-[3-(Trimethoxysilyl)Propyl]2-Propenamide Treatment of Silica Gel)

First, the preparation of an acrylamide-containing silane coupling agent was carried out by the following procedure. 4-Pyrrolidinopyridine (151 mg) was added to a flask, and after deaeration, a nitrogen purge was carried out. To the flask were added in order the following under a nitrogen atmosphere: 95 mL of toluene, 4.04 mL of N-methylaminopropyltrimethoxysilane, and 5.66 mL of triethylamine. Next, a solution (5 mL) of 2.16 mL of acryloyl chloride in toluene was added dropwise over a period of about 10 minutes under a nitrogen atmosphere. The system was heated at 60° C. for 3 hours, thereby synthesizing an N-methyl-N-[3-(trimethoxysilyl)propyl]2-propenamide crude product.

The crude product obtained by the above reaction was filtered to remove the by-product triethylamine hydrochloride, and the filtrate was caught on 20.1 g of silica gel. Before that, the silica gel was vacuum dried at 160° C. for 3 hours and then cooled to room temperature. The crude product was washed with about 10 mL of toluene, after which a toluene solution in which silica gel had been dispersed was heated and refluxed for 3 hours at 130° C. in an oil bath. Following the end of heat treatment, the system was cooled to room temperature, filtered and collected, and then washed with 100 mL of toluene, 400 mL of methanol and 200 mL of acetone. The resulting stationary phase was vacuum dried overnight at 60° C., giving an acrylamide-bonded silica gel (referred to below as "acrylamide-treated silica gel").

The carbon content of the silica gel thus obtained was 4.26 mass %. The specific surface area of the resulting silica gel, as measured by the BET method, was 119 m$^2$/g, and the average particle size was regarded to be 3 μm.

Example 1

An amount of 1.11 g of 2-methacryloyloxyethyl phosphorylcholine (PA) was placed in a flask, and 5.89 mL of 2-propanol and 0.1 mL of pyridine were added in this order. To the flask was added 0.4 mL of a 2-propanol solution of dimethyl 2,2'-azobis(2-methylpropionate) adjusted to 0.23 M. Finally, 2.00 g of the acrylamide-treated silica gel obtained in Preparation Example 1 (average particle size, 3 μm; average pore size, 300 A) was added in a flask, and the flask was heated in an oil bath to 60° C. and held for 6 hours. Following the end of copolymerization, the resulting powder was filtered and collected, and then washed four times with 50 mL of methanol. The stationary phase thus obtained was vacuum dried overnight at 60° C.

Given that the carbon content of the resulting silica gel was 8.81 mass % and the carbon content of the starting silica gel was 4.26 mass %, about 12.7 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the following structure.

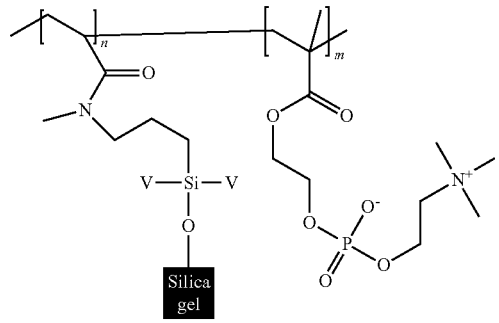

Example 2

An amount of 1.69 g of 2-(N-3-sulfopropyl-N,N-dimethylammonium)ethyl methacrylate (AS) was placed in a flask, and 5.23 mL of water and 0.1 mL of pyridine were added in this order. To the flask was added 0.4 mL of an aqueous solution of 2,2'-azobis(2-methylpropionamidine) dihydrochloride adjusted to 0.38 M. Finally, 2.00 g of the acrylamide-treated silica gel obtained in Preparation Example 1 (average particle size, 3 µm; average pore size, 300 A) was added in a flask, and the flask was heated in an oil bath to 70° C. and held for 6 hours. Following the end of copolymerization, 10 mL of a saturated saline solution was added to the resulting powder, which was then filtered and collected. The collected product was then washed twice with 10 mL of a saturated saline solution, once with 50 mL of water, twice with 50 mL of methanol, and once with 50 mL of acetone. The stationary phase thus obtained was vacuum dried overnight at 60° C.

Given that the carbon content of the resulting silica gel was 10.02 mass % and the carbon content of the starting silica gel was 4.19 mass %, about 15.6 mass % of poly(AS) was assumed to be bonded. Measurement of the carbon content was carried out by elemental analysis, and calculation was carried out assuming the amount of increase to be entirely attributable to poly(AS).

The resulting poly(AS)-bonded silica gel can be assumed to have the following structure.

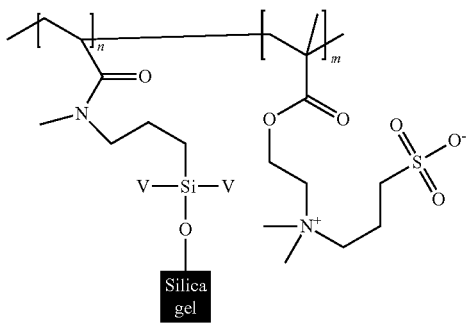

Example 3

An amount of 1.83 g of 3-(methacryloylamino)propyltrimethylammonium chloride (A) was placed in a flask, and 5.93 mL of 2-methoxyethanol and 0.1 mL of N,N-dimethylacetamide were added in this order. To the flask was added 0.4 mL of a 2-methoxyethanol solution of dimethyl 2,2'-azobis(2-methylpropionate) adjusted to 0.52 M. Finally, 2.21 g of the acrylamide-treated silica gel obtained in Preparation Example 1 (average particle size, 3 µm; average pore size, 300 A) was added in a flask, and the flask was heated in an oil bath to 80° C. and held for 6 hours. Following the end of copolymerization, 10 mL of methanol was added to the resulting powder, which was then filtered and collected. The collected product was then washed four times with 50 mL of methanol and once with 50 mL of acetone. The stationary phase thus obtained was vacuum dried overnight at 60° C.

Given that the carbon content of the resulting silica gel was 10.09 mass % and the carbon content of the starting silica gel was 4.19 mass %, about 13.3 mass % of poly(A) was assumed to be bonded. Measurement of the carbon content was carried out by elemental analysis, and calculation was carried out assuming the amount of increase to be entirely attributable to poly(A).

The resulting poly(A)-bonded silica gel can be assumed to have the following structure.

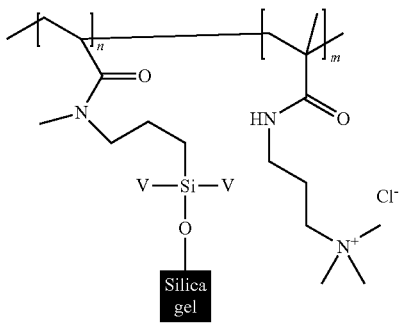

Fourth Example

An amount of 1.88 g of poly(ethylene glycol) monomethyl ether methacrylate (PEG) having a number average molecular weight of 500 was placed in a flask, and 5.26 mL of diethylene glycol dimethyl ether and 0.1 mL of N,N-dimethylacetamide were added in this order. To the flask was added 0.4 mL of a diethylene glycol dimethyl ether solution of dimethyl 2,2'-azobis(2-methylpropionate) adjusted to 0.234 M. Finally, 2.03 g of the acrylamide-treated silica gel obtained in Preparation Example 1 (average particle size, 3 µm; average pore size, 300 A) was added in a flask, and the flask was heated in an oil bath to 80° C. and held for 6 hours. Following the end of copolymerization, 10 mL of methanol was added to the resulting powder, which was then filtered and collected. The collected product was then washed three times with 50 mL of methanol and once with 50 mL of acetone. The stationary phase thus obtained was vacuum dried overnight at 60° C.

Given that the carbon content of the resulting silica gel was 12.24 mass % and the carbon content of the starting silica gel was 4.19 mass %, about 18.6 mass % of poly(PEG) was assumed to be bonded. Measurement of the carbon content was carried out by elemental analysis, and calculation was carried out assuming the amount of increase to be entirely attributable to poly(PEG).

The resulting poly(PEG)-bonded silica gel can be assumed to have the following structure.

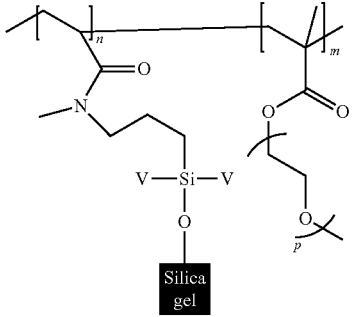

Example 5

An amount of 1.60 g of potassium 3-(methacryloyloxy)propanesulfonate (S) was placed in a flask, and 5.81 mL of water and 0.1 mL of N,N-dimethylacetamide were added in this order. To the flask was added 0.4 mL of an aqueous solution of 2,2'-azobis(2-methylpropionamidine) dihydrochloride adjusted to 0.38 M. Finally, 2.03 g of the acrylamide-treated silica gel obtained in Preparation Example 1 (average particle size, 3 μm; average pore size, 300 A) was added in a flask, and the flask was heated in an oil bath to 80° C. and held for 6 hours. Following the end of copolymerization, 10 mL of water was added to the resulting powder, which was then filtered and collected. The collected product was then washed twice with 10 mL of water, once with 40 mL of methanol, and once with 50 mL of acetone. The stationary phase thus obtained was vacuum dried overnight at 60° C.

Given that the carbon content of the resulting silica gel was 9.52 mass % and the carbon content of the starting silica gel was 4.19 mass %, about 21.7 mass % of poly(S) was assumed to be bonded. Measurement of the carbon content was carried out by elemental analysis, and calculation was carried out assuming the amount of increase to be entirely attributable to poly(S).

The resulting poly(S)-bonded silica gel can be assumed to have the following structure.

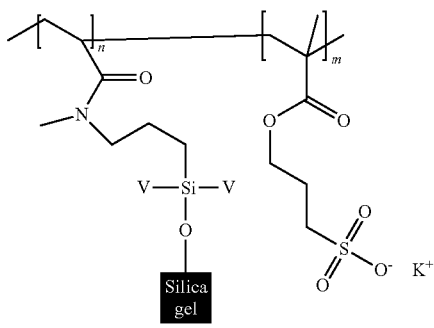

Example 6

An amount of 0.98 g of 2-hydroxyethyl methacrylate (HEMA) was placed in a flask, and 6.09 mL of 2-methoxyethanol and 0.1 mL of N,N-dimethylacetamide were added in this order. To the flask was added 0.4 mL of a 2-methoxyethanol solution of dimethyl 2,2'-azobis(2-methylpropionate) adjusted to 0.47 M. Finally, 2.02 g of the acrylamide-treated silica gel obtained in Preparation Example 1 (average particle size, 3 μm; average pore size, 300 A) was added in a flask, and the flask was heated in an oil bath to 80° C. and held for 6 hours. Following the end of copolymerization, 10 mL of methanol was added to the resulting powder, which was then filtered and collected. The collected product was then washed three times with 50 mL of methanol and once with 50 mL of acetone. The stationary phase thus obtained was vacuum dried overnight at 60° C.

Given that the carbon content of the resulting silica gel was 10.45 mass % and the carbon content of the starting silica gel was 4.19 mass %, about 13.9 mass % of poly(HEMA) was assumed to be bonded. Measurement of the carbon content was carried out by elemental analysis, and calculation was carried out assuming the amount of increase to be entirely attributable to poly(HEMA).

The resulting poly(HEMA)-bonded silica gel can be assumed to have the following structure.

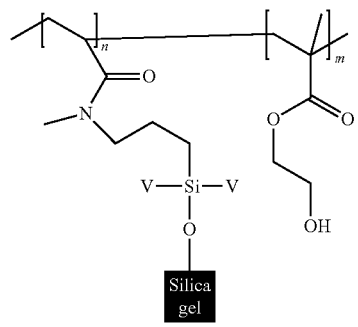

Example 7

An amount of 0.53 g of acrylamide (Am) was placed in a flask, and 6.47 mL of water and 0.1 mL of N,N-dimethylacetamide were added in this order. To the flask was added 0.4 mL of an aqueous solution of 2,2'-azobis(2-methylpropionamidine) dihydrochloride adjusted to 0.47 M. Finally, 2.21 g of the acrylamide-treated silica gel obtained in Preparation Example 1 (average particle size, 3 μm; average pore size, 300 A) was added in a flask, and the flask was heated in an oil bath to 70° C. and held for 6 hours. Following the end of copolymerization, 20 mL of methanol and 20 mL of water were added to the resulting powder, which was then filtered and collected. The collected product was then washed twice with 50 mL of water, once with 50 mL of methanol, and once with 50 mL of acetone. The stationary phase thus obtained was vacuum dried overnight at 60° C.

Given that the carbon content of the resulting silica gel was 7.87 mass % and the carbon content of the starting silica gel was 4.19 mass %, about 8.6 mass % of poly(Am) was assumed to be bonded. Measurement of the carbon content was carried out by elemental analysis, and calculation was carried out assuming the amount of increase to be entirely attributable to poly(Am).

The resulting poly(Am)-bonded silica gel can be assumed to have the following structure.

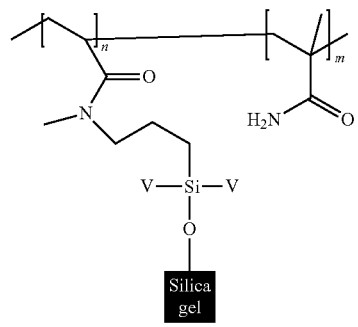

Example 8

An amount of 2.48 g of 2-methacryloyloxyethyl phosphorylcholine (PA) was placed in a flask, and 8.92 mL of 2-methoxyethanol and 0.2 mL of N,N-dimethylacetamide were added in this order. To the flask was added 0.4 mL of a 2-methoxyethanol solution of dimethyl 2,2'-azobis(2-methylpropionate) adjusted to 0.52 M. Finally, 3.49 g of acrylamide-treated core-shell silica gel obtained in the same manner as in Preparation Example 1 (average particle size, 2.7 µm; average pore size, 160 A; shell thickness, 0.5 µm) was added in a flask, and the flask was heated in an oil bath to 80° C. and held for 6 hours. Following the end of copolymerization, 10 mL of methanol was added to the resulting powder, which was then filtered and collected. The collected product was then washed four times with 50 mL of methanol. The stationary phase thus obtained was vacuum dried overnight at 60° C.

Given that the carbon content of the resulting silica gel was 5.57 mass % and the carbon content of the starting silica gel was 2.97 mass %, about 6.6 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the same structure as in Example 1.

Example 9

An amount of 1.55 g of 2-methacryloyloxyethyl phosphorylcholine (PA) was placed in a flask, and 5.45 mL of 2-methoxyethanol and 0.1 mL of N,N-dimethylacetamide were added in this order. To the flask was added 0.4 mL of a 2-methoxyethanol solution of dimethyl 2,2'-azobis(2-methylpropionate) adjusted to 0.33 M. Finally, 2.24 g of acrylamide-treated silica gel obtained in the same manner as in Preparation Example 1 (average particle size, 1.6 µm; average pore size, 700 A) was added in a flask, and the flask was heated in an oil bath to 80° C. and held for 6 hours. Following the end of copolymerization, 15 mL of methanol was added to the resulting powder, which was then filtered and collected. The collected product was then washed four times with 50 mL of methanol. The stationary phase thus obtained was vacuum dried overnight at 60° C.

Given that the carbon content of the resulting silica gel was 14.02 mass % and the carbon content of the starting silica gel was 6.49 mass %, about 24.5 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the same structure as in Example 1.

Example 10

An amount of 3.55 g of 2-methacryloyloxyethyl phosphorylcholine (PA) was placed in a flask, and 12.5 mL of 2-methoxyethanol and 0.2 mL of N,N-dimethylacetamide were added in this order. To the flask was added 0.8 mL of a 2-methoxyethanol solution of dimethyl 2,2'-azobis(2-methylpropionate) adjusted to 0.37 M. Finally, 5.01 g of acrylamide-treated non-porous silica gel obtained in the same manner as in Preparation Example 1 (average particle size, 2.5 µm) was added in a flask, and the flask was heated in an oil bath to 80° C. and held for 6 hours. Following the end of copolymerization, 20 mL of methanol was added to the resulting powder, which was then filtered and collected. The collected product was then washed four times with 50 mL of methanol. The stationary phase thus obtained was vacuum dried overnight at 60° C.

Given that the carbon content of the resulting non-porous silica gel was 0.62 mass % and the carbon content of the starting non-porous silica gel was 0.44 mass %, about 0.4 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the same structure as in Example 1.

Example 11

An amount of 1.55 g of 2-methacryloyloxyethyl phosphorylcholine (PA) was placed in a flask, and 5.32 mL of 2-methoxyethanol and 0.1 mL of N,N-dimethylacetamide were added in this order. To the flask was added 0.4 mL of a 2-propanol solution of dimethyl 2,2'-azobis(2-methylpropionate) adjusted to 0.33 M. To the flask was added 2.21 g of silica gel (average particle size, 3 µm; average pore size, 300 A). Finally, 0.12 mL of 3-(trimethylsilyl)propyl methacrylate was then added in a flask, and the flask was heated in an oil bath to 60° C. and held for 6 hours. Following the end of copolymerization, 15 mL of methanol was added to the resulting powder, which was then filtered and collected. The collected product was then washed with 15 mL of methanol, and then with 25 mL of acetone. The stationary phase thus obtained was vacuum dried overnight at 60° C.

Given that the carbon content of the resulting silica gel was 9.14 mass %, about 20.4 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the same structure as in Example 1.

Example 12

An amount of 1.56 g of 2-methacryloyloxyethyl phosphorylcholine (PA) was placed in a flask, and 5.45 mL of 2-methoxyethanol and 0.1 mL of N,N-dimethylacetamide were added in this order. To the flask was added 0.4 mL of a 2-methoxyethanol solution of dimethyl 2,2'-azobis(2-methylpropionate) adjusted to 0.33 M. Finally, 2.21 g of acrylamide-treated silica gel surface treated with thiol (average particle size, 3 µm; average pore size, 300 A; commercially available product) was added in a flask, and the flask was heated in an oil bath to 80° C. and held for 6 hours. Following the end of copolymerization, 20 mL of methanol was added to the resulting powder, which was then filtered and collected. The collected product was then washed three times with 50 mL of methanol and once with 50 mL of acetone. The stationary phase thus obtained was vacuum dried overnight at 60° C.

Given that the carbon content of the resulting silica gel was 6.41 mass % and the carbon content of the starting silica gel was 1.94 mass %, about 11.7 mass % of poly(PA) was assumed to be bonded. Measurement of the carbon content was carried out by elemental analysis, and calculation was carried out assuming the amount of increase to be entirely attributable to poly(PA).

The resulting poly(PA)-bonded silica gel can be assumed to have the following structure.

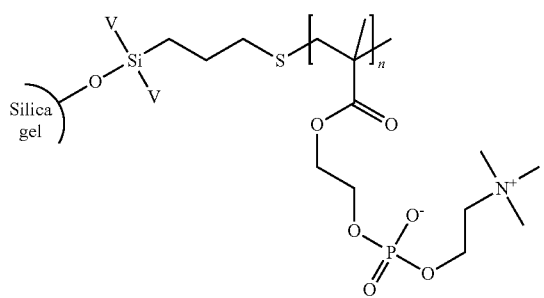

Example 13

An amount of 1.68 g of [2-(methacryloyloxy)ethyl]dimethyl-(3-sulfopropyl)ammonium hydroxide (AS) was placed in a flask, and 5.33 mL of water and 0.1 mL of pyridine were added in this order. To the flask was added 0.4 mL of an aqueous solution of 2,2'-azobis(2-methylpropionamidine) dihydrochloride adjusted to 0.38 M. Finally, 2.21 g of acrylamide-treated silica gel surface treated with thiol (average particle size, 3 μm; average pore size, 300 A; commercially available product) was added in a flask, and the flask was heated in an oil bath to 70° C. and held for 6 hours. Following the end of copolymerization, 20 mL of a saturated saline solution was added to the resulting powder, which was then filtered and collected. The collected product was then washed twice with 30 mL of a saturated saline solution, twice with 30 mL of water, once with 50 mL of methanol, and once with 50 mL of acetone. The stationary phase thus obtained was vacuum dried overnight at 60° C.

Given that the carbon content of the resulting silica gel was 2.35 mass % and the carbon content of the starting silica gel was 1.94 mass %, about 0.9 mass % of poly(AS) was assumed to be bonded. Measurement of the carbon content was carried out by elemental analysis, and calculation was carried out assuming the amount of increase to be entirely attributable to poly(AS).

The resulting poly(AS)-bonded silica gel can be assumed to have the following structure.

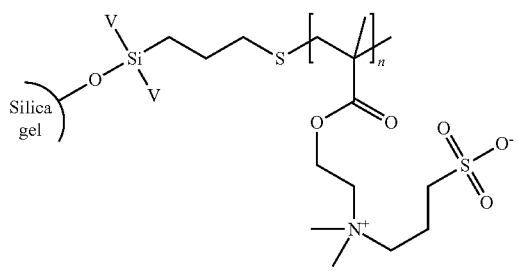

The poly(PA)-bonded silica gel stationary phase obtained in Example 1 was slurry packed into a 3.0 mmqx150 mm column, and vitamin B1, vitamin B2, vitamin B6, and vitamin B12 were separated by SFC. FIG. 1 is an SFC chromatogram under conditions of linear gradient from 10% to 60% of methanol containing 20 mM of ammonium formate as a modifier over 10 minutes. Chromatography was carried out under the following conditions: flow rate, 3 mL/min; temperature, 40° C.; back pressure, 15.0 MPa. The sample detection conditions are as follows. Vitamin B1: UV 266 nm; vitamin B2: UV 268 nm; vitamin B6: UV 284 nm; Vitamin B12: 361 nm.

Figure 2:
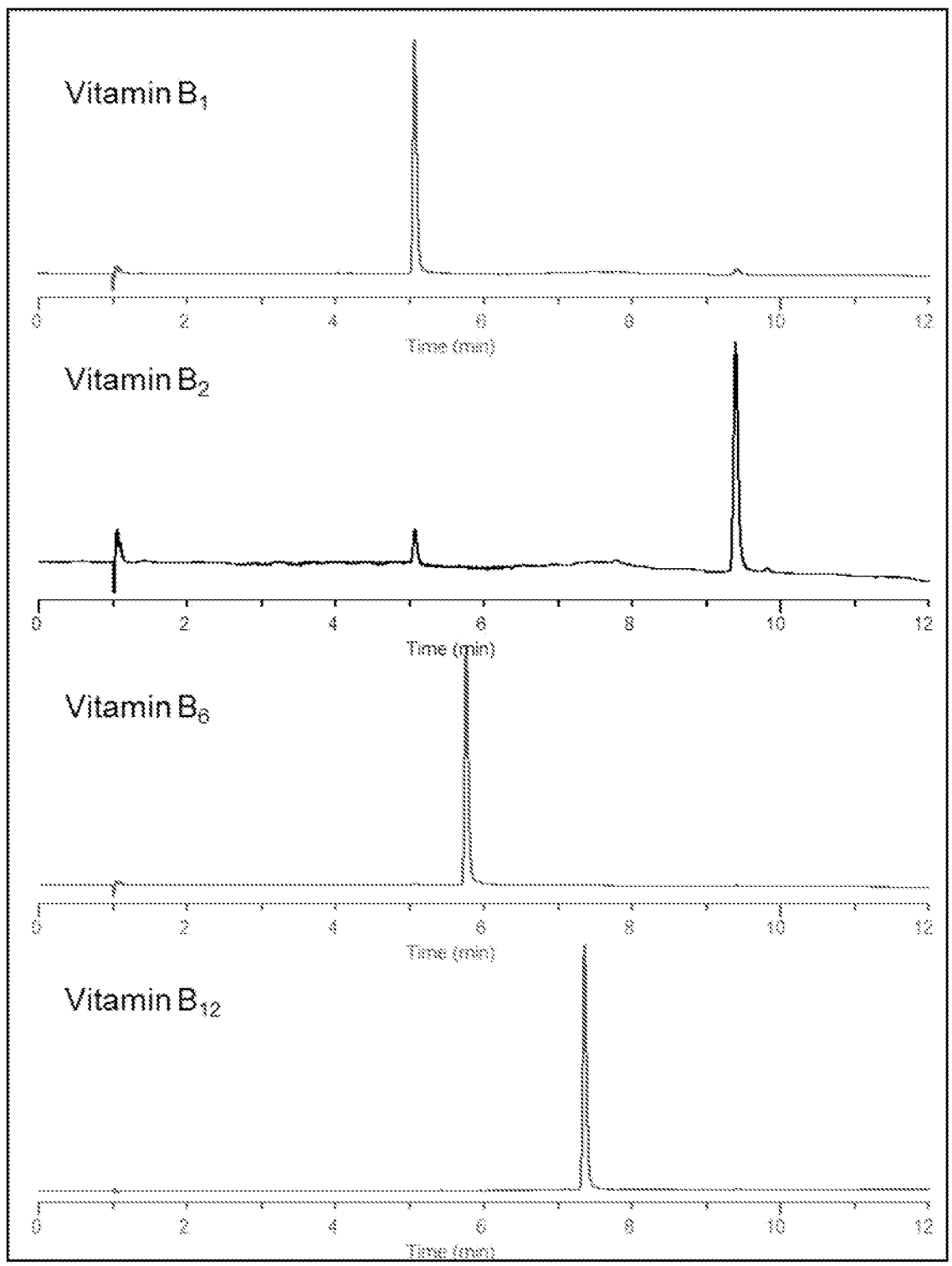
FIG. 2 is a chromatogram showing the separation of water-soluble vitamins by SFC using a poly(4-vinylpyridine)-bonded silica gel as the stationary phase.

FIG. 2 is an SFC chromatogram obtained by analysis of water soluble vitamins under the same conditions as in FIG. 1 using an existing commercially available P4VP column (DAICEL DCpak P4VP; particle size, 3 μm).

The stationary phase according to an embodiment of the present disclosure clearly exhibits good retention properties and a good separating ability for water soluble vitamins.

Figure 3:
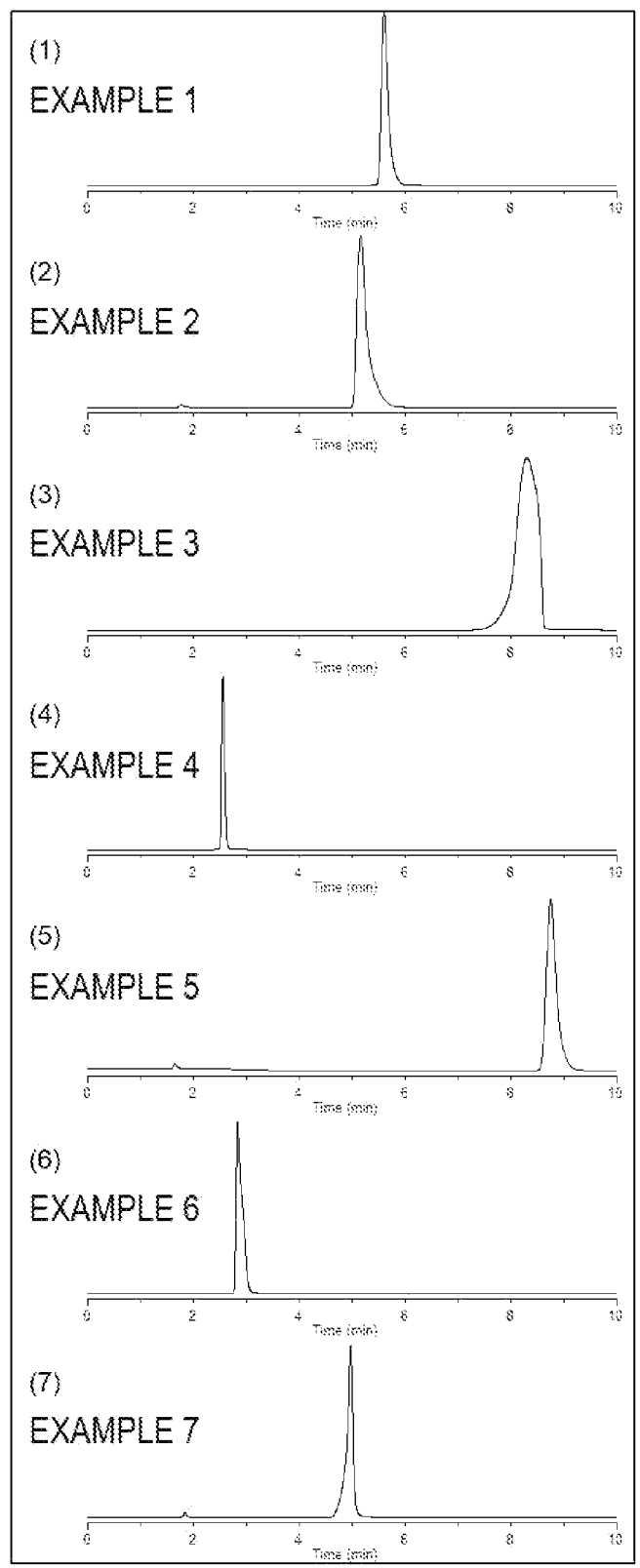
FIG. 3 is a chromatogram showing the separation of uridine by HPLC using various vinyl polymer-bonded silica gel as the stationary phase.

The resulting stationary phases of Examples 1 to 7 were each slurry packed into a 4.6 mmφx150 mm column, and uridine was analyzed by HPLC using each of such columns. The analysis was carried out under the following conditions: flow rate, 1 mL/min; temperature, 25° C.; mobile phase A, acetonitrile; mobile phase B, 20 mM of aqueous ammonium acetate solution; mobile phase ratio A:B=90:10. This sample is commonly used as an indicator of the retention strength of a stationary phase in hydrophilic interaction chromatography (HILIC) mode (J. Chromatogr. A1218 (2011) 5903). The resulting chromatograms are shown in FIG. 3.

Figure 4:
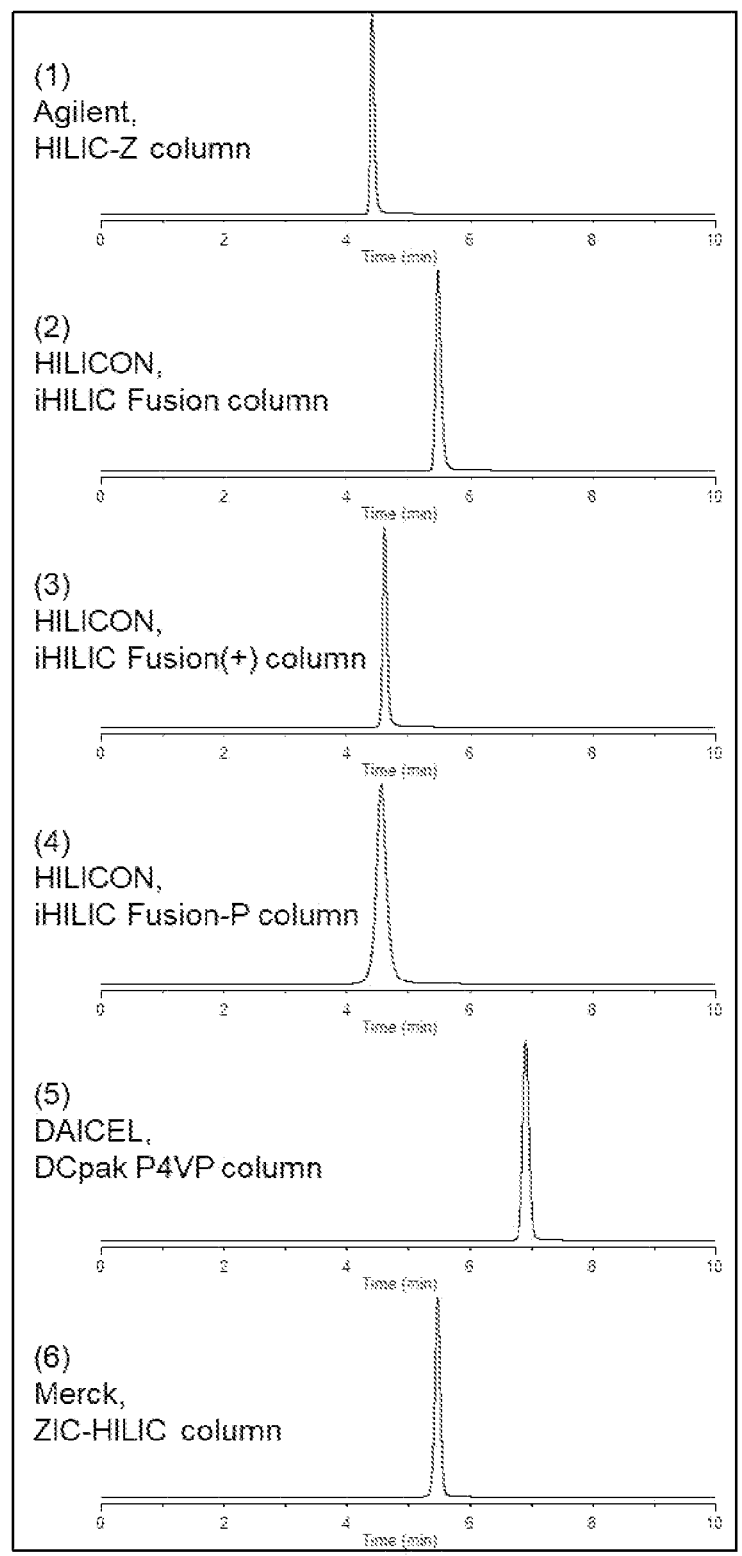
FIG. 4 is a chromatogram showing the separation of uridine by HPLC using an existing commercially available silica gel as the stationary phase.

Using existing commercially available columns of Agilent HILIC-Z (particle size: 2.7 μm); HILICON iHILIC Fusion (particle size: 3.5 μm), HILICON iHILIC Fusion (+) (particle size: 3.5 μm); HILICON iHILIC Fusion (P) (particle size: 5.0 μm), DAICEL, DCpakP4VP (particle size: 3.0 μm); and Merck, ZIC-HILIC (particle size: 3.0 in), uridine was analyzed under the same conditions as when the stationary phases of Examples 1 to 7 were used. The chromatograms are shown in FIG. 4. Table 1 lists values of the retention coefficient (k) shown in the chromatograms of FIGS. 3 and 4. Calculation was made taking the retention time of toluene as to. In particular, Examples 3 and 5 were found to show more excellent retention properties than that of existing commercially available products.

TABLE 1

| Examples, Columns | t0 Toluene | t Uridine | k Uridine |
|---|---|---|---|
| Example 1 | 1.741 | 5.601 | 2.22 |
| Example 2 | 1.795 | 5.154 | 1.87 |
| Example 3 | 1.563 | 8.302 | 4.31 |
| Example 4 | 1.914 | 2.55 | 0.33 |
| Example 5 | 1.687 | 8.749 | 4.19 |
| Example 6 | 1.867 | 2.831 | 0.52 |
| Example 7 | 1.883 | 4.971 | 1.64 |
| Example 9 | 1.285 | 4.441 | 2.46 |
| Example 11 | 1.585 | 5.864 | 2.70 |
| Example 12 | 1.847 | 4.482 | 1.43 |
| P4VP | 1.821 | 6.905 | 2.79 |
| ZIC-HILIC | 1.619 | 5.471 | 2.38 |
| iHILIC-Fusion | 1.592 | 5.478 | 2.44 |
| iHILIC-Fusion (+) | 1.727 | 4.61 | 1.67 |
| iHILIC-Fusion (P) | 1.732 | 4.55 | 1.63 |
| Amide 80 | 1.569 | 8.549 | 4.45 |
| HILIC-Z | 1.44 | 4.407 | 2.06 |

Figure 5:
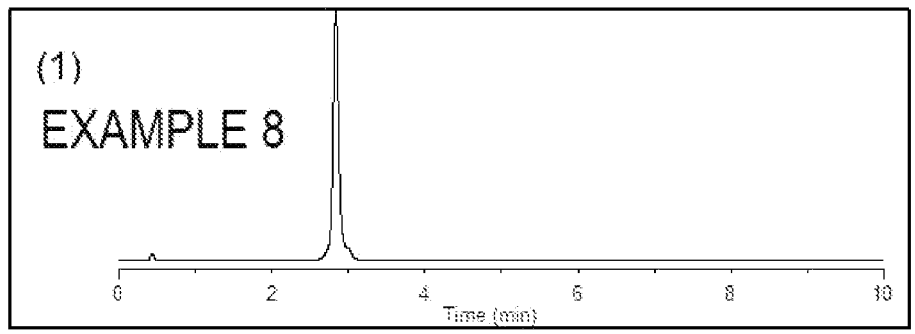
FIG. 5 is a chromatogram showing the separation of uridine by HPLC using, as the stationary phase, a poly(PA)-bonded silica gel prepared from a 1.6 μm silica gel as a raw material.

The resulting stationary phase of Example 8 was slurry packed into a 3.0 mmφx50 mm column, and uridine was analyzed by HPLC using such column. Analysis was carried out under the following conditions: flow rate, 0.43 mL/min; temperature, 25° C.; mobile phase A, acetonitrile; mobile phase B, 20 mM of aqueous ammonium acetate solution; mobile phase ratio A:B=90:10. The resulting chromatograms are shown in FIG. 5. Despite passing the solution through at a low flow rate, the retention time is shorter than that in Example 1, and the peak symmetry is also good, and therefore, the stationary phase may be suitable for high-throughput analysis.

Figure 6:
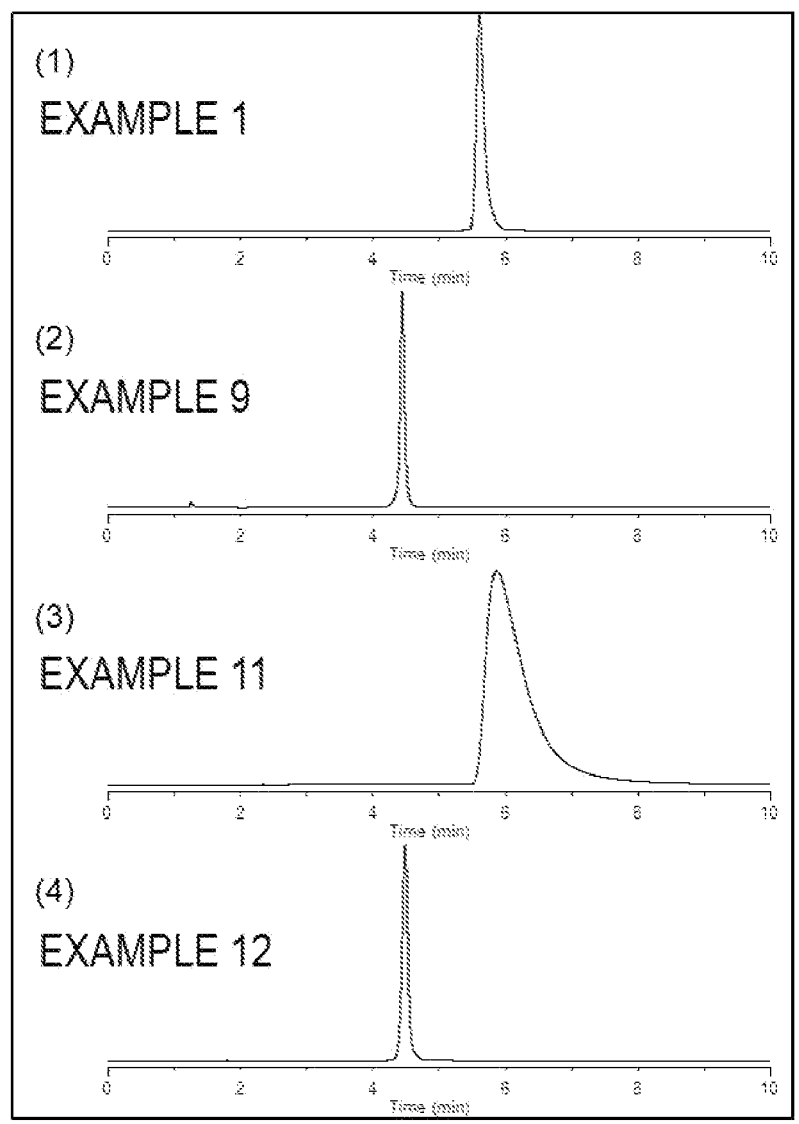
FIG. 6 is a chromatogram showing the separation of uridine by HPLC using various preparation methods and as the stationary phase, a poly(PA)-bonded silica gel prepared using a core-shell silica gel as a raw material.

The resulting stationary phases of Examples 1, 9, 11, and 12 were each slurry packed into a 4.6 mmφx150 mm column, and uridine was analyzed by HPLC using each of such columns. The analysis was carried out under the following conditions: flow rate, 1 mL/min; temperature, 25° C.; mobile phase A, acetonitrile; mobile phase B, 20 mM of aqueous ammonium acetate solution; mobile phase ratio A:B=90:10. The resulting chromatograms are shown in FIG. 6. The peaks of Examples 9 and 12 were sharper as compared to that of Example 1. Table 1 lists values of the retention coefficient (k) shown in the chromatograms of FIG. 6.

INDUSTRIAL APPLICABILITY

The stationary phase according to an embodiment of the present disclosure has good separation characteristics for materials that have been difficult to separate by known separation agent, particularly hydrophilic substances. Specifically, an improvement in the number of column plates is anticipated. It was also shown that the hydrophilic compounds are more excellent in retention properties than that of existing commercially available products. It is thus expected that the stationary phase according to an embodiment of the present disclosure will contribute not only to the discovery and improvement of novel separation conditions for various substances that have hitherto been difficult to separate, but also to improvements in the convenience of identification and analysis of separated substances.

The invention claimed is:

1. A stationary phase for chromatography, comprising inorganic carrier particles to which is bonded a polymer having a hydrophilic group on repeating units of a main chain thereof,
wherein the stationary phase has a structure represented by Formula (II):

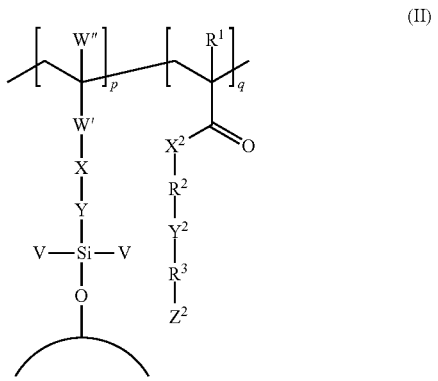

(II)

wherein in Formula (II), W' is a single bond or an alkylene group of 1 to 10 carbon atoms which may have a branched chain; W''' is hydrogen or an alkyl group of 1 to 12 carbon atoms; X is an amide group, an ester group, an N-alkylamide group of 1 to 3 carbon atoms, an ether group, a sulfoxide group, a sulfone group, a sulfide group, or a phosphate ester group; Y is an alkylene group of 1 to 30 carbon atoms; V is an ether group bonded to the inorganic carrier surface, an alkoxy group of 1 to 5 carbon atoms, halogen, alkylmercaptyl groups of 1 to 20 carbon atoms, nitrogen-containing groups, an allyl group, or a 2-methyl-2-propenyl group; $R^r$ is hydrogen or an alkyl of 1 to 6 carbon atoms; $R^2$ is a single bond or an alkylene of 1 to 12 carbon atoms; $R^3$ is an alkylene of 1 to 6 carbon atoms; $X^2$ is —O—, —NH—, or —N(CH$_3$)—; $Y^2$ is —PO$_4$—, —N$^+$H$_2$—, —N$^+$(R$^4$)$_2$—, or (—(CH$_2$)$_a$—O-)$_b$, a is an integer of 1 to 5, and b is an integer of 1 to 20; $Z^2$ is hydrogen, alkyl of 1 to 6 carbon atoms, halogen, —N$^+$R$_3^4$, —SO$_3$—, —CO$_2$—, or —PO$_4$—R$^4$; R$^4$ is hydrogen, an alkyl of 1 to 6 carbon atoms, or a hydroxyalkyl of 1 to 6 carbon atoms; p is from 1 to 10; q is from 10 to 3000.

2. The stationary phase for chromatography according to claim 1, wherein the inorganic carrier particles are porous inorganic particles or non-porous inorganic particles.

3. The stationary phase for chromatography according to claim 2, wherein the inorganic carrier particles are porous inorganic particles, and the porous inorganic particles are core-shell particles.

4. The stationary phase for chromatography according to claim 1, wherein an average particle size is from 0.1 μm to 50 μm.

5. The stationary phase for chromatography according to claim 1, wherein the stationary phase is suitable for supercritical fluid chromatography.

6. A method for separating a target material, the method comprising:
providing the stationary phase of claim 1 and a mobile phase comprising a supercritical fluid; and
conducting a supercritical fluid chromatography to separate a target substance by using the stationary phase and the mobile phase.

7. A stationary phase for chromatography, comprising inorganic carrier particles to which is bonded a polymer having a hydrophilic group on repeating units of a main chain thereof,
wherein the stationary phase has a structure represented by Formula (V):

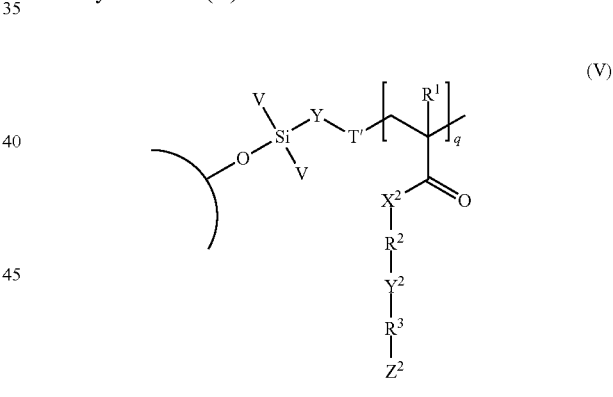

(V)

in Formula (V), Y is a single bond or an alkylene group of 1 to 30 carbon atoms; V is an ether group bonded to the inorganic carrier surface, an alkoxy group of 1 to 5 carbon atoms, halogen, nitrogen-containing groups, an allyl group, an isopropenyl group, or an alkyl group of 1 to 5 carbon atoms; T' is an alkylene residue of 1 to 12 carbon or a thioether; $R^1$ is hydrogen or an alkyl of 1 to 6 carbon atoms; $R^2$ is a single bond or an alkylene of 1 to 12 carbon atoms; $R^3$ is an alkylene of 1 to 6 carbon atoms; $X^2$ is —O—, —NH—, or —N(CH$_3$)—; $Y^2$ is, —PO$_4$—, —N$^+$H$_2$—, —N$^+$(R$^4$)$_2$—, or (—(CH$_2$)$_a$—O-)$_b$, a is an integer of 1 to 5, and b is an integer of 1 to 20; $Z^2$ is hydrogen, alkyl of 1 to 6 carbon atoms, halogen, —N$^+$R$_3^4$, —SO$_3$—, —CO$_2$—, or —PO$_4$—R$^4$; R$^4$ is hydrogen, an alkyl of 1 to 6 carbon atoms, or a hydroxyalkyl of 1 to 6 carbon atoms; q is an integer of 2 to 300.

8. The stationary phase for chromatography according to claim 7, wherein the inorganic carrier particles are porous inorganic particles or non-porous inorganic particles.

9. The stationary phase for chromatography according to claim 8, wherein the inorganic carrier particles are porous inorganic particles, and the porous inorganic particles are core-shell particles.

10. The stationary phase for chromatography according to claim 7, wherein an average particle size is from 0.1 μm to 50 μm.

11. The stationary phase for chromatography according to claim 7, which is used for supercritical fluid chromatography.

12. A method for separating a target material, the method comprising:
providing the stationary phase of claim 7 and a mobile phase comprising a supercritical fluid; and
conducting a supercritical fluid chromatography to separate a target substance by using the stationary phase and the mobile phase.

13. A method for producing a stationary phase for chromatography, the method comprising any of steps (i), (iii) or (iv):
(i) radically copolymerizing a (meth)acrylic monomer having a hydrophilic group or a (meth)acrylamide monomer having a hydrophilic group with an inorganic carrier particle having a polymerizable functional group bonded thereto;
(iii) copolymerizing a (meth)acrylic monomer having a hydrophilic group or a (meth)acrylamide monomer having a hydrophilic group with a silane coupling agent having a polymerizable double bond, and silane coupling the resulting polymer on a surface of an inorganic carrier particle; and
(iv) copolymerizing a silane coupling agent having a polymerizable double bond with a (meth)acrylic monomer having a hydrophilic group or a (meth)acrylamide monomer having a hydrophilic group in the presence of an inorganic carrier particle, to produce the stationary phase for chromatography of claim 1.

14. The method for producing a stationary phase for chromatography according to claim 13, wherein a (meth)acrylic monomer having a hydrophilic group or a (meth)acrylamide monomer having a hydrophilic group has a structure represented by Formula (1):

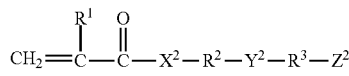  (1)

in Formula (1),
$R^1$ is hydrogen or an alkyl of 1 to 6 carbon atoms;
$R^2$ is a single bond or an alkylene of 1 to 12 carbon atoms;
$R^3$ is an alkylene of 1 to 6 carbon atoms;
$X^2$ is —O—, —NH— or —N(CH$_3$)—, $Y^2$ is

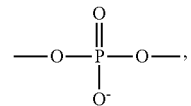

—N$^+$H$_2$—, —N$^+$(R$^4$)$_2$—, or

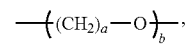

a is an integer of 1 to 5, and b is an integer of 1 to 20;
$Z^2$ is hydrogen, alkyl of 1 to 6 carbon atoms, halogen, —N*R$_3^4$,

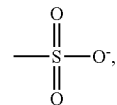

—CO$_2^-$, or

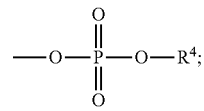

$R^4$ is hydrogen, an alkyl of 1 to 6 carbon atoms, or a hydroxyalkyl of 1 to 6 carbon atoms.

15. The method for producing a stationary phase for chromatography according to claim 13, wherein the inorganic carrier particles are porous inorganic particles or non-porous inorganic particles.

16. The method for producing a stationary phase for chromatography according to claim 15, wherein the inorganic carrier particles are porous inorganic particles, and the porous inorganic particles are core-shell particles.

* * * * *